(12) United States Patent
Li et al.

(10) Patent No.: US 11,641,470 B2
(45) Date of Patent: May 2, 2023

(54) PLANAR PREDICTION MODE FOR VISUAL MEDIA ENCODING AND DECODING

(71) Applicant: ZTE Corporation, Guangdong (CN)

(72) Inventors: Ming Li, Guangdong (CN); Ping Wu, Guangdong (CN); Zhao Wu, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/181,739

(22) Filed: Feb. 22, 2021

(65) Prior Publication Data

US 2021/0243447 A1 Aug. 5, 2021

Related U.S. Application Data

(63) Continuation of application No. PCT/CN2018/102315, filed on Aug. 24, 2018.

(51) Int. Cl.
*H04N 19/132* (2014.01)
*H04N 19/105* (2014.01)
*H04N 19/159* (2014.01)
*H04N 19/176* (2014.01)

(52) U.S. Cl.
CPC ......... *H04N 19/132* (2014.11); *H04N 19/105* (2014.11); *H04N 19/159* (2014.11); *H04N 19/176* (2014.11)

(58) Field of Classification Search
None
See application file for complete search history.

(56) References Cited

U.S. PATENT DOCUMENTS

| 2017/0099490 A1 | 4/2017 | Seregin et al. |
| 2017/0150180 A1 | 5/2017 | Lin et al. |
| 2018/0063553 A1* | 3/2018 | Zhang .................. H04N 19/463 |

(Continued)

FOREIGN PATENT DOCUMENTS

| CN | 105594213 | 5/2016 |
| CN | 107113434 | 8/2017 |

(Continued)

OTHER PUBLICATIONS

International Search Report and Written Opinion in International Application No. PCT/CN2018/102315, dated May 23, 2019, 7 pages.

(Continued)

*Primary Examiner* — Michael J Hess
(74) *Attorney, Agent, or Firm* — Perkins Coie LLP

(57) ABSTRACT

Devices, systems and methods for deriving intra prediction samples when the intra prediction mode for a coding block is the planar mode are described. In an aspect, a method for video coding includes selecting a first set of reference samples that are reconstructed neighboring samples of a current block, and determining a prediction value for a prediction sample of the current block by interpolating at least one of the first set and a second set of reference samples, where a reference sample of the second set of reference samples is based on a weighted sum of a first sample and a second sample from the first set of reference samples, and where the reference sample is aligned horizontally with the first sample, aligned vertically with the second sample, and positioned on an opposite side of the prediction sample with respect to either the first or the second sample.

11 Claims, 16 Drawing Sheets

(56) References Cited

U.S. PATENT DOCUMENTS

| 2019/0200020 | A1 | 6/2019 | Lee | |
|---|---|---|---|---|
| 2020/0228831 | A1* | 7/2020 | Heo | H04N 19/105 |
| 2020/0296417 | A1* | 9/2020 | Ko | H04N 19/463 |

FOREIGN PATENT DOCUMENTS

| CN | 107810635 | | 3/2018 |
|---|---|---|---|
| CN | 108141585 | | 6/2018 |
| WO | 2018/004089 | | 3/2018 |
| WO | 2018/044089 | | 3/2018 |
| WO | 2018/0440891 | | 3/2018 |
| WO | 2018044089 | A1 | 3/2018 |
| WO | 2018063886 | A1 | 4/2018 |

OTHER PUBLICATIONS

Co-Pending EP Application No. 18390084, Extended Search Report dated Mar. 11, 2022, 12 pages.

Panusopone, et al. "CE3: Unequal Weight Planar Prediction (Test 1.5.1)" Joint Video Exploration Team (JVET), of ITU-T SG 16 WP 3 and ISO/IEC JTC 1/SC 29/WG 11 11th Meeting: Ljubljana, SL, Jul. 10-20, 2018, Document: JVET-K0055, 6 pages.

Zheng, et al. "Adaptive Block Coding Order for Intra Prediction in HEVC" IEEE Transactions On Circuits And Systems For Video Technology, vol. 26, No. L L, Nov. 2016.

Co-Pending Chinese Application No. 2018800964766, filed Aug. 24, 2018, First Office Action dated Apr. 1, 2022, 28 pages with unofficial translation.

Co-Pending Korean Application No. 2023-016091839, filed Aug. 24, 2018, First Office Action dated Feb. 16, 2023, 10 pages with unofficial summary translation.

Co-Pending Chinese Application No. 2018800964766, filed Aug. 24, 2018, Third Office Action dated Jan. 10, 2023, 23 pages with unofficial translation.

Second Office Action for co-pending Chinese Application No. 2018800964766, dated Sep. 21, 2022, 19 pages with unofficial translation.

Panusopone, K. et al., "CE3: Unequal Weight Planar Prediction (Test 1.5.1)," Joint Video Exploration Team (JVET) of ITU-T SG 16 WP3 and ISO/IEC JTC 1/SC 29/WG 11), Jul. 20, 2018, pp. 1-6.

* cited by examiner

PLANAR PREDICTION MODE FOR VISUAL MEDIA ENCODING AND DECODING

CROSS-REFERENCE TO RELATED APPLICATIONS

This application is a continuation of and claims priority to International Patent Application No. PCT/CN2018/102315, filed on Aug. 24, 2018, the contents of which are incorporated herein by reference in their entirety.

TECHNICAL FIELD

This document is directed generally to video coding techniques.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Methods, systems, and devices for related to the planar prediction mode for video encoding and decoding are described. The described methods may be applied to both the existing video coding standards (e.g., H.265, also known as High Efficiency Video Coding (HEVC)) and future video coding standards or codecs.

In one exemplary aspect, a video coding method is disclosed. The method includes selecting a first set of reference samples that are reconstructed neighboring samples of a current block, and determining a prediction value for a prediction sample of the current block by interpolating at least one of the first set of reference samples and at least one of a second set of reference samples, where a reference sample of the second set of reference samples is based on a weighted sum of a first sample and a second sample from the first set of reference samples, and where the reference sample is aligned horizontally with the first sample, aligned vertically with the second sample, and positioned on an opposite side of the prediction sample with respect to one of the first sample and the second sample.

In yet another exemplary aspect, the above-described methods are embodied in the form of processor-executable code and stored in a computer-readable program medium.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Techniques for compressing digital video and picture utilizes correlation characteristics among pixel samples to remove redundancy in the video and picture. An encoder takes advantage of spatial correlation between neighboring samples to eliminate spatial redundancy by employing methods referred to as "intra prediction" which predict the current coding pixels using neighboring encoded pixels. Since digital video is composed of a sequence of pictures, besides spatial correlation in a single picture, temporal correlation among pictures is also exploited by an encoder equipped with methods collectively referred to as "inter prediction" which predict the coding pixels in a current coding picture referencing to already one or more already encoded pictures. Motion estimation (ME) and motion compensation (MC) are two of key steps for performing inter prediction.

In video coding standards adopted by industry, the above and left neighboring pixels of a block are used in the intra prediction process to get prediction samples of the block. Intra prediction mode indicates the method for deriving intra prediction samples of a block. For example, there are 9 intra prediction modes in H.264/AVC standard for 4×4 block. In H.265/HEVC standard, 33 angular prediction modes plus DC mode and planar mode are introduced for effective compression of a coding units (CUs).

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Overview of the Planar Prediction Mode and Video Encoding/Decoding

As specified in H.265/HEVC standard, a value of a prediction sample in a block in planar mode is derived as a weighted sum of the values of the following neighboring samples of the block: the top-right one, the bottom-left one, an above one and a left one. When using planar mode, the process or module for getting a predicted sample first pads a right neighboring sample as the top-right neighboring sample and calculating a horizontal interpolation value of the right neighboring sample and a left neighboring sample, then pads the bottom neighboring samples as the bottom-left neighboring sample and calculates a vertical interpolation value of the bottom neighboring sample and an above neighboring sample, finally sets predicted sample as an average of the two interpolation values.

Figure 1:
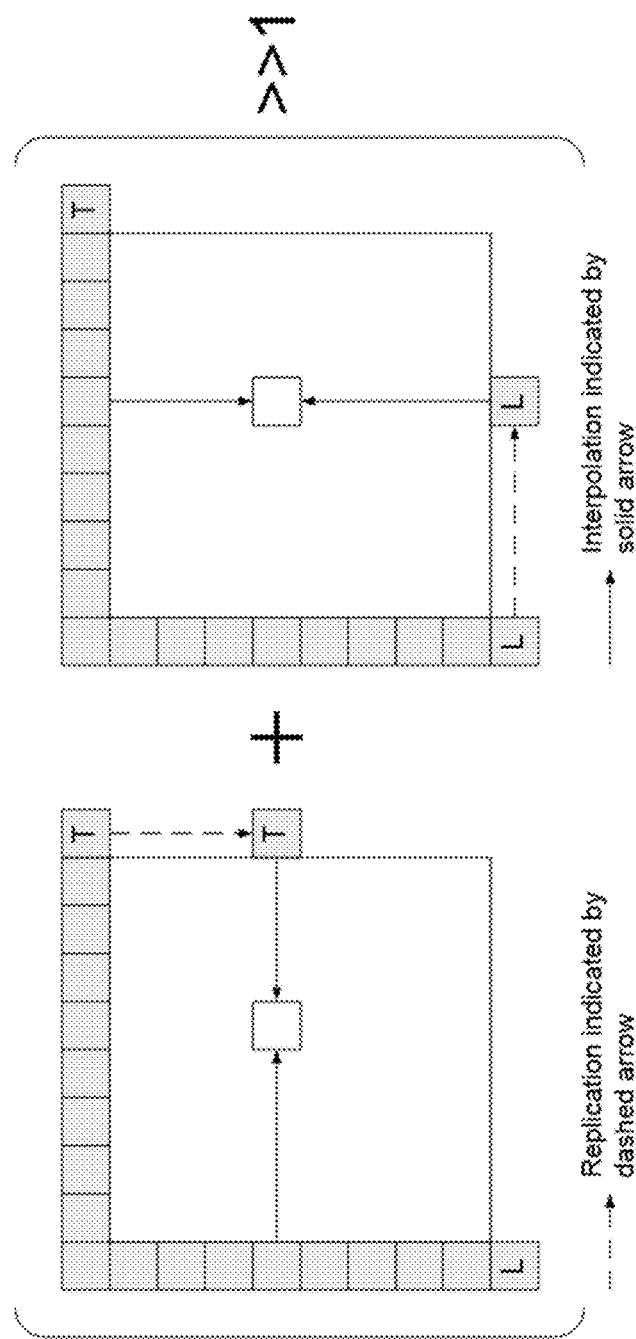
FIG. 1 shows an example the planar prediction mode.

FIG. 1 shows the derivation process of predicted samples of planar mode in the H.265 standard. As shown therein, a prediction sample in a block is derived as an average of a first prediction value (obtained as an interpolation in horizontal direction) and a second prediction value (obtained as an interpolation in vertical direction), wherein the first prediction value is calculated as a weighted average of the reference sample "T" (e.g., the top-right one) and a reference sample of the left neighboring samples in the same row as the prediction sample (e.g., the left one), and the second prediction value is calculated as a weighted average of the reference sample "L" (e.g., the bottom-left one) and a reference sample of the above neighboring samples in the same column as the prediction sample (e.g., the above one).

This process, in the context of FIG. 1, may be summarized as:
 (1) Pad the right neighboring samples using sample "T", and calculate a horizontal interpolation value;
 (2) Pad the bottom neighboring samples using sample "L", and calculate a vertical interpolation value; and
 (3) Set the predicted value of the planar prediction mode as an average of the two interpolation values.

1.1 Drawbacks of Existing Implementations

One of the drawbacks of the existing planar mode in H.265/HEVC standard is that padding right and bottom neighboring samples with fixed position samples brings fake texture characteristics to right and bottom neighboring samples which leads to deterioration of prediction accuracy and efficiency of planar mode.

In another existing implementation (denoted JVET-K0055), the bottom-right neighboring sample is first derived as a weighted average of the top-right neighboring sample (e.g., sample "T" in FIG. 1) and the bottom-left neighboring sample (e.g., sample "L" in FIG. 1), wherein the weights are set as the distance between sample "T" and the bottom-right neighboring sample and the distance between sample "L" and the bottom-right neighboring sample. Then a right neighboring sample of the current block is determined as weighted average of the bottom-right neighboring sample and sample "T", wherein the weights are set as the distance between the right neighboring sample and the bottom-right neighboring sample and the distance between the right neighboring sample and sample "T". A bottom neighboring sample of the current block is determined as weighted average of the bottom-right neighboring sample and sample "L", wherein the weights are set as the distances between the bottom neighboring sample and the bottom-right neighboring sample and sample "L", respectively.

However, the JVET-K0055 implementation suffers from the same drawback as the existing planar mode implementation in that only sample "T" and sample "L" are involved in the interpolation of neighboring samples.

Yet another implementation (denoted JVET-K0242) interpolates right and bottom neighboring samples using the bottom-right neighboring sample first derived. In contrast to JVET-K0055, the bottom-right neighboring sample is set according to the size of the current block. When the product of width and height of the current block is not larger than a predefined value (e.g., 32), a method similar to that in JVET-K0055 is used to calculate the bottom-right neighboring sample (denoted as Pbr1). Otherwise, the bottom-right neighboring sample is set as an average value of Pbr1 and Pbr2, wherein Pbr2 is selected from up to 9 values of 9 preset neighboring sample positions of the current block. Then the right and bottom reference samples are derived using the same method as that in JVET-K0055.

However, even though the JVET-K0242 implementation employs more reference values from a number of preset neighboring positions for large blocks, this technique may generate more fake texture since the spatial correlation among the samples in a block and preset neighboring positions decreases as their spatial distances increase.

1.2 Example Implementations for Video Encoding and Decoding

The present document denotes a video as being composed of a sequence of one or more pictures. A bitstream, which is also referred to as a video elementary stream, is generated by an encoder processing a video or picture. A bitstream can also be a transport stream or media file that is an output of performing a system layer process on a video elementary stream generated by a video or picture encoder. Decoding a bitstream results in a video or a picture.

The function of a system layer process is to encapsulate a bitstream (or video elementary stream). For example, the video elementary stream is packed into a transport stream or media file as payloads. The system layer process also includes operations of encapsulating transport stream or media file into a stream for transmission or a file for storage as payloads. A data unit generated in the system layer process is referred to as a system layer data unit. Information attached in a system layer data unit during encapsulating a payload in the system layer process is called system layer information, for example, a header of a system layer data unit. Extracting a bitstream obtains a sub-bitstream containing a part of bits of the bitstream as well as one or more necessary modifications on syntax elements by the extraction process. Decoding a sub-bitstream results in a video or a picture, which, compared to the video or picture obtained by decoding the bitstream, may be of lower resolution and/or of lower frame rate. A video or a picture obtained from a sub-bitstream could also be a region of the video or picture obtained from the bitstream.

Figure 2:
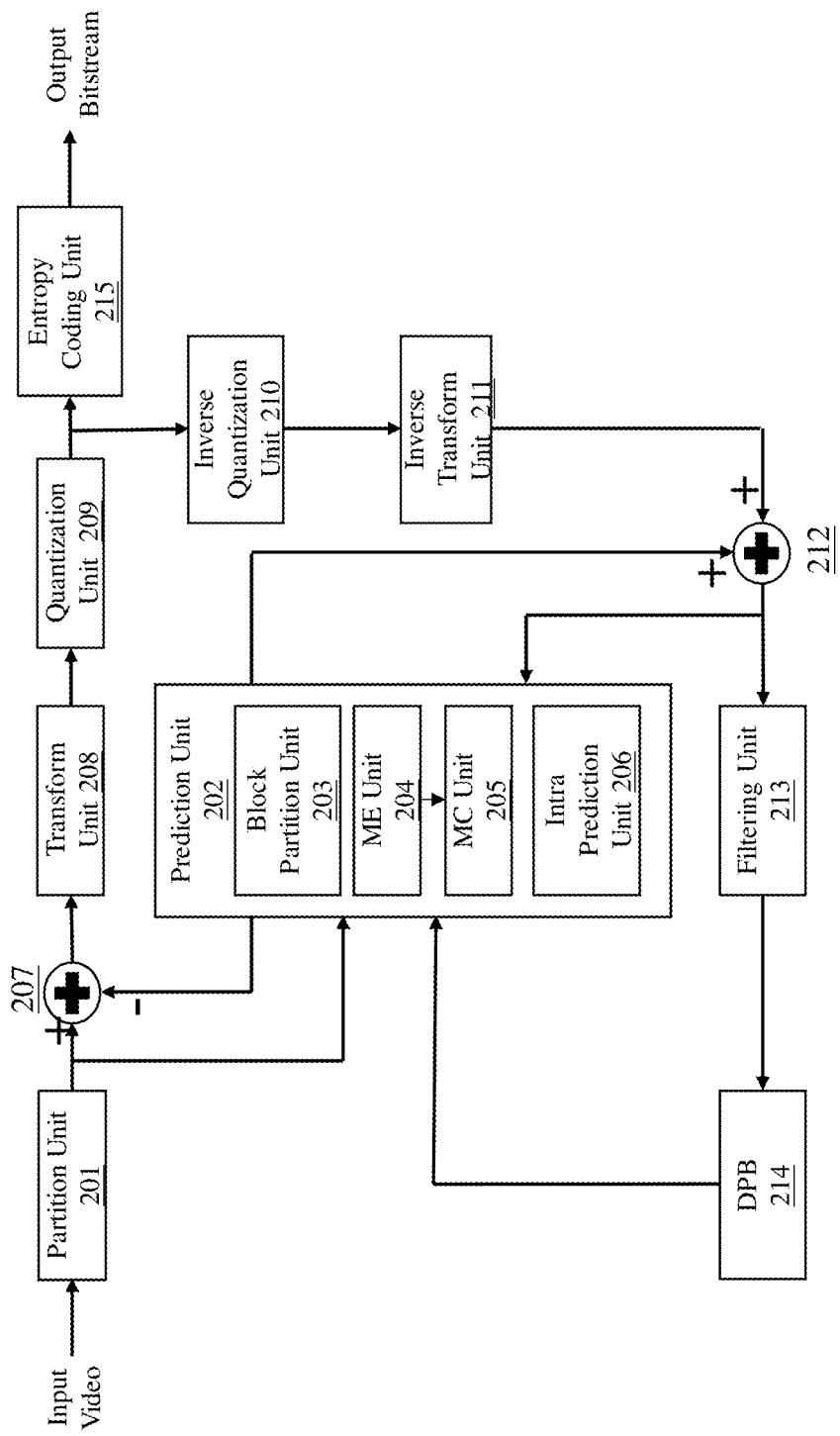
FIG. 2 shows an example of a video or picture encoder.

FIG. 2 is a diagram illustrating an encoder utilizing one or more methods described in this disclosure for coding a video or a picture. The input of the encoder is a video (or more generally, visual media), and the output is a bitstream. In the example of a video, which is composed of a sequence of pictures, the encoder processes the pictures one-by-one in a preset order, e.g., the encoding order. The encoding order is determined according to a prediction structure specified in a configuration file for the encoder. In some embodiments, an encoding order of pictures in a video (corresponding to a decoding order of pictures at a decoder end) may be identical to, or may be different from, a displaying order of the pictures.

As shown in FIG. 2, partition unit 201 partitions a picture in an input video according to a configuration of the encoder. Generally, a picture can be partitioned into one or more maximum coding blocks. A maximum coding block is the maximum allowed or configured block in encoding process (e.g., a square region in a picture). A picture is partitioned into one or more slices, and each slice can contain an integer number of maximum coding blocks, or a non-integer number of maximum coding blocks. In some embodiments, a picture may be partitioned into one more tiles, wherein a tile contains an integer number of maximum coding blocks, or a non-integer number of maximum coding blocks. Partition unit 201 can be configured to partition a picture using a fixed pattern (e.g., a picture is partitioned into slices which contains a row of maximum coding blocks), or using a dynamic pattern. For example, to adapt to the restriction of maximum transmission unit (MTU) size, partition unit 201 employs dynamic slice partitioning method to ensure that a number of coding bits of every slice does not exceed MTU restriction.

Prediction unit 202 determines prediction samples of a coding block. Prediction unit 202 includes block partition unit 203, motion estimation (ME) unit 204, motion compensation (MC) unit 205 and intra prediction unit 206. An input of the prediction unit 202 is a maximum coding block outputted by partition unit 201 and attribute parameters associated with the maximum coding block, e.g., a location of the maximum coding block in a picture, slice or tile. Prediction unit 202 partitions the maximum coding block into one or more coding blocks, which can be further partitioned into smaller coding blocks. One or more partitioning methods can be applied including quadtree, binary split and ternary split methods. Prediction unit 202 determines prediction samples for coding block obtained in partitioning.

In some embodiments, prediction unit 202 can further partition a coding block into one or more prediction blocks to determine prediction samples. Prediction unit 202 employs one or more pictures in decoded picture buffer (DPB) unit 214 as reference to determine inter prediction samples of the coding block, or employs reconstructed parts of the picture outputted by adder 212 (which is not processed by filtering unit 213) as a reference to derive inter prediction samples of the coding block. Prediction unit 202 determines prediction samples of the coding block and associated parameters for deriving the prediction samples, which are also output parameters of prediction unit 202, by, for example, using general rate-distortion optimization (RDO) methods.

Inside prediction unit 202, block partition unit 203 determines the partitioning of the coding block. Block partition unit 203 partitions the maximum coding block into one or more coding blocks, which can also be further partitioned into smaller coding blocks. One or more partitioning method can be applied including quadtree, binary split and ternary split. In some embodiments, block partition unit 203 can further partition a coding block into one or more prediction blocks to determine prediction samples. Block partition unit 203 can adopt RDO methods in the determination of partitioning of the coding block. Output parameters of block partition unit 203 includes one or more parameters indicating the partitioning of the coding block.

ME unit 204 and MC unit 205 utilize one or more decoded pictures from DPB 214 as reference pictures to determine inter prediction samples of a coding block. ME unit 204 constructs one or more reference lists containing one or more reference pictures and determines one or more matching blocks in reference picture for the coding block. MC unit 205 derives prediction samples using the samples in the matching block, and calculates a difference (e.g., residual) between original samples in the coding block and the prediction samples. Output parameters of ME unit 204 indicate a location of matching block including reference list index, reference index (refIdx), motion vector (MV), etc., wherein reference list index indicates the reference list containing the reference picture in which the matching block locates, the reference index indicates the reference picture in the reference list containing the matching block, and the MV indicates the relative offset between the locations of the coding block and the matching block in an identical coordinate for representing locations of pixels in a picture. Output parameters of MC unit 205 are inter prediction samples of the coding block, as well as parameters for constructing the inter prediction samples, for example, weighting parameters for samples in the matching block, filter type and parameters for filtering samples in the matching block. Generally, RDO methods can be applied jointly to ME unit 204 and MC unit 205 for getting optimal matching block in rate-distortion (RD) sense and corresponding output parameters of the two units.

In some embodiments, ME unit 204 and MC unit 205 can use the current picture containing the coding block as a reference to obtain intra prediction samples of the coding block. In the present disclosure, intra prediction is meant to convey that the data in a picture containing a coding block is employed as a reference for deriving prediction samples of the coding block. In this case, ME unit 204 and MC unit 205 use the reconstructed part of the current picture, wherein the reconstructed part is from the output of adder 212 and is not processed by filtering unit 213. For example, the encoder allocates a picture buffer to (temporally) store output data of adder 212. Another method for the encoder is to reserve a special picture buffer in DPB 214 to keep the data from adder 212.

Intra prediction unit 206 uses the reconstructed part of the current picture containing the coding block as a reference to obtain intra prediction samples of the coding block, wherein the reconstructed part is not processed by filtering unit 213. Intra prediction unit 206 takes reconstructed neighboring samples of the coding block as input of a filter for deriving intra prediction samples of the coding block, wherein the filter can be an interpolation filter (e.g., for calculating prediction samples when using angular intra prediction), or a low-pass filter (e.g., for calculating a DC value). In some embodiments, intra prediction unit 206 can perform searching operations to get a matching block of the coding block in a range of the reconstructed part in the current picture, and set samples in the matching block as intra prediction samples of the coding block. Intra prediction unit 206 invokes RDO methods to determine an intra prediction mode (e.g., a method for calculating intra prediction samples for a coding block) and corresponding prediction samples. Besides intra prediction samples, the output of intra prediction unit 206 also includes one or more parameters indicating an intra prediction mode in use.

When an intra prediction mode for the coding block is planar mode, intra prediction unit 206 invokes a method described in the present document to derive intra prediction samples. Intra prediction unit 206 first determines the neighboring samples used as reference for planar mode. Intra prediction unit 206 classifies available neighboring samples of the coding block as first reference samples. The available neighboring samples include reconstructed samples at neighboring positions of the coding block. The available neighboring samples may also include derived samples in the same row or column as the reconstructed samples. For example, above and left neighboring samples (also including derived samples) are used in intra prediction process. Intra prediction unit 206 classifies samples that are at neighboring positions of the coding block but are not encoded as second reference samples. For example, the second reference samples may include the samples on the opposite neighboring sides of the coding block to the available neighboring samples.

Intra prediction unit 206 calculates the second reference samples according to the first samples. A value of a second reference sample is set equal to a weighted sum of two or more samples in the first reference samples which are in the same row or column as that of the second reference sample. Intra prediction unit 206 employs equal weights or unequal weights in the calculation of the second reference sample. For example, intra prediction unit 206 sets unequal weights according to the distance between the second reference sample and a sample in the first reference samples of the same row or column as the second reference sample.

Intra prediction unit 206 determines intra prediction samples of the coding block when using planar mode as interpolation values of the first reference samples and the second reference samples.

Adder 207 is configured to calculate difference between original samples and prediction samples of a coding block. The output of adder 207 is the residual of the coding block. The residual can be represented as an N×M 2-dimensional matrix, wherein N and M are two positive integers, and N and M can be of equal or different values.

As shown in FIG. 2, transform unit 208 takes the residual as its input, and may apply one or more transform methods to the residual. From a signal processing perspective, a transform method can be represented by a transform matrix. In some embodiments, transform unit 208 may determine to use a rectangular block (in this disclosure, a square block is a special case of a rectangular block) with the same shape and size as that of the coding block to be a transform block for the residual. In other embodiments, transform unit 208 may partition the residual into several rectangular blocks (including a special case where the width or height of the rectangular block is one sample) and the perform transform operations on several rectangular blocks sequentially. In an example, this may be based on a default order (e.g., raster scanning order), a predefined order (e.g., an order corresponding to a prediction mode or a transform method), a selected order for several candidate orders.

In some embodiments, transform unit 208 performs multiple transforms on the residual. For example, transform unit 208 first performs a core transform on the residual, and then performs a secondary transform on coefficients obtained after finishing the core transform. Transform unit 208 may utilize RDO methods to determine transform parameter, which indicates execution manners used in the transform process applied to the residual block, e.g., partitioning the residual block into transform blocks, transform matrices, multiple transforms, etc. The transform parameter is included in output parameters of transform unit 208. Output parameters of transform unit 208 include the transform parameter and data obtained after transforming the residual (e.g., transform coefficients) which could be represented by a 2-dimensional matrix.

Quantization unit 209 quantizes the data outputted by transform unit 208 after it has transformed the residual. The quantizer used in quantization unit 209 can be one or both of scalar quantizer and vector quantizer. For example, the quantization step of a scalar quantizer is represented by a quantization parameter (QP) in a video encoder. Generally, an identical mapping between the QP and quantization step is preset or predefined in an encoder and a corresponding decoder. A value of the QP, for example, picture level QP and/or block level QP, can be set according to a configuration file applied to an encoder, or be determined by a coder control unit in an encoder. For example, the coder control unit determines a quantization step of a picture and/or a block using rate control (RC) methods and then converts the quantization step into the QP according to the mapping between the QP and quantization step. The control parameter for quantization unit 209 is QP. Output of quantization unit 209 is one or more quantized transform coefficients (referred to as a "Level") represented in a form of a 2-dimensional matrix.

Inverse quantization unit 210 performs scaling operations on output of quantization 209 to generate reconstructed coefficients. Inverse transform unit 211 performs inverse transforms on the reconstructed coefficients from the inverse quantization unit 210 according to the transform parameters from transform unit 208. The output of inverse transform unit 211 is the reconstructed residual. In some embodiments, when an encoder skips the quantizing step in coding a block (e.g., an encoder that implements RDO methods may decide whether or not to apply quantization to a coding block), the encoder guides the output data of transform unit 208 to inverse transform unit 211 by bypassing quantization unit 209 and inverse quantization unit 210.

Adder 212 takes the reconstructed residual and prediction samples of the coding block from prediction unit 202 as input, calculates reconstructed samples of the coding block, and stores the reconstructed samples in a buffer (e.g., a picture buffer). In some embodiments, the encoder allocates a picture buffer to (temporally) store output data of adder 212. In other embodiments, the encoder reserves a special picture buffer in DPB 214 to store the data generated by adder 212.

Filtering unit 213 performs filtering operations on reconstructed picture samples in the decoded picture buffer and outputs decoded pictures. Filtering unit 213 may include one filter or several cascading filters. For example, according to H.265/HEVC standard, filtering unit is composed of two cascading filters, e.g., a deblocking filter and a sample adaptive offset (SAO) filter. In some embodiments, filtering unit 213 may also include neural network filters. Filtering unit 213 may start filtering reconstructed samples of a picture when reconstructed samples of all coding blocks in the picture have been stored in decoded picture buffer, which can be referred to as "picture layer filtering". In some embodiments, an alternative implementation (referred to as "block layer filtering") of picture layer filtering for filtering unit 213 is to start filtering reconstructed samples of a coding block in a picture if the reconstructed samples are not used as reference in encoding all successive coding blocks in the picture. Block layer filtering does not require filtering unit 213 to hold filtering operations until all reconstructed samples of a picture are available, and thus reduces the delay between threads in an encoder. Filtering unit 213 determines filtering parameters by invoking RDO methods. The output of filtering unit 213 is the decoded samples of a picture, and the filtering parameters include indication information of the filter(s), filter coefficients, filter control parameters and so on.

The encoder stores the decoded picture from filtering unit 213 in DPB 214. The encoder may determine one or more instructions that are applied to DPB 214, which are used to control operations performed on the pictures in DPB 214, e.g., the duration a picture is stored in DPB 214, outputting a picture from DPB 214, etc. In this disclosure, such instructions are taken as output parameters of DPB 214.

Entropy coding unit 215 performs binarization and entropy coding on one or more coding parameters of a picture, which converts a value of a coding parameter into a code word consisting of binary symbol "0" and "1" and writes the code word into a bitstream according to, for example, a specification or a standard. The coding parameters may be classified as texture data and non-texture data. Texture data includes transform coefficients of a coding block, and non-texture data includes other data in the coding parameters except the texture data, including output parameters of the units in the encoder, parameter set, header, supplemental information, etc. The output of entropy coding unit 215 is a bitstream conforming, for example, to a specification or a standard.

Figure 3:
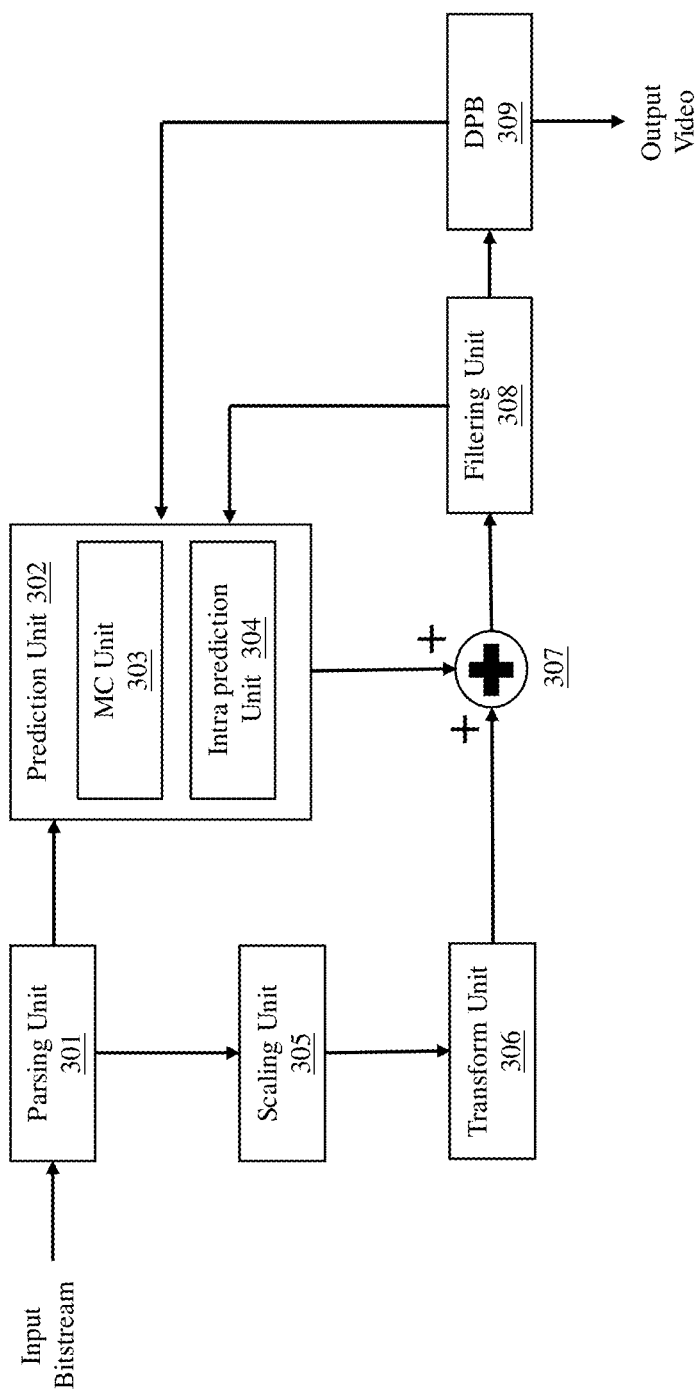
FIG. 3 shows an example of a video or picture decoder.

FIG. 3 is a diagram illustrating a decoder utilizing the method in this disclosure in decoding a bitstream generated by the exemplary encoder shown in FIG. 2. The input of the decoder is a bitstream, and the output of the decoder is a decoded video or picture obtained by decoding the bitstream.

Parsing unit 301 in the decoder parses the input bitstream. Parsing unit 301 uses entropy decoding methods and binarization methods to convert each code word in the bitstream consisting of one or more binary symbols (e.g., "0" and "1") to a numerical value of a corresponding parameter. Parsing unit 301 also derives parameter value according to one or more available parameters. For example, when a flag in the bitstream indicates a decoding block is the first decoding block in a picture, parsing unit 301 sets an address parameter, which indicates an address of the first decoding block of a slice in a picture to be 0.

Parsing unit 301 passes one or more prediction parameters for deriving prediction samples of a decoding block to prediction unit 302. In some embodiments, the prediction parameters include output parameters of partitioning unit 201 and prediction unit 202 in the encoder embodiment shown in FIG. 2.

Parsing unit 301 passes one or more residual parameters for reconstructing the residual of a decoding block to scaling unit 305 and transform unit 306. In some embodiments, the residual parameters include output parameters of transform unit 208 and quantization unit 209 and one or more quantized coefficients (referred to as "Levels") outputted by quantization unit 209 in the encoder embodiment shown in FIG. 2. In other embodiments, parsing unit 301 passes filtering parameters to filtering unit 308 for filtering (e.g. in-loop filtering) reconstructed samples in the picture.

Prediction unit 302 derives prediction samples of a decoding block according to the prediction parameters. Prediction unit 302 is composed of motion compensation (MC) unit 303 and intra prediction unit 304. Input of prediction unit 302 may also include a reconstructed part of a current picture being decoded and outputted from adder 307 (which is not processed by filtering unit 308) and one or more decoded pictures in DPB 309.

When the prediction parameters indicate inter prediction mode is used to derive prediction samples of the decoding block, prediction unit 302 employs the same approach as that for motion estimation (ME) unit 204 in the encoder embodiment, shown in FIG. 2, to construct one or more reference picture lists. A reference list contains one or more reference pictures from DPB 309. MC unit 303 determines one or more matching blocks for the decoding block according to indication of reference list, reference index and MV in the prediction parameters, and uses the same method as that in MC unit 205 to get inter prediction samples of the decoding block. Prediction unit 302 outputs the inter prediction samples as the prediction samples of the decoding block.

In some embodiments, MC unit 303 may use the current picture being decoded, and containing the decoding block as a reference, to obtain intra prediction samples of the decoding block. In this case, MC unit 303 uses the reconstructed part of the current picture, wherein the reconstructed part is from the output of adder 307 and is not processed by filtering unit 308. For example, the decoder allocates a picture buffer to (temporally) store output data of adder 307. In another example, the decoder reserves a special picture buffer in DPB 309 to keep the data from adder 307.

When the prediction parameters indicate an intra prediction mode is used to derive prediction samples of the decoding block, prediction unit 302 employs the same approach as that for intra prediction unit 206 to determine reference samples for intra prediction unit 304 from reconstructed neighboring samples of the decoding block. Intra prediction unit 304 gets an intra prediction mode (e.g., DC mode, planar mode, or an angular prediction mode) and derives intra prediction samples of the decoding block using reference samples following specified process of the intra prediction mode. In some embodiments, the intra prediction mode implemented in the encoder embodiment in FIG. 2 (e.g., intra prediction unit 206) is identical to that implemented in the decoder (e.g., intra prediction unit 304). In some embodiments, if the prediction parameters indicate a matching block (including its location) in the current decoding picture (which contains the decoding block) for the decoding block, intra prediction unit 304 use samples in the matching block to derive the intra prediction samples of the decoding block. For example, intra prediction unit 304 sets intra prediction samples equal to the samples in the matching block. Prediction unit 302 sets prediction samples of the decoding block equal to intra prediction samples outputted by intra prediction unit 304.

When an intra prediction mode for the coding block is planar mode, intra prediction unit 304 invokes a method described in the present document to derive intra prediction samples. Intra prediction unit 304 first determines the neighboring samples used as reference for planar mode. Intra prediction unit 304 classifies available neighboring samples of the coding block as first reference samples. The available neighboring samples include reconstructed samples at neighboring positions of the coding block. The available neighboring samples may also include derived samples in the same row or column as the reconstructed samples. For example, above and left neighboring samples (also including derived samples) are used in intra prediction process. Intra prediction unit 304 classifies samples that are at neighboring positions of the coding block but are not encoded as second reference samples. For example, the second reference samples may include the samples on the opposite neighboring sides of the coding block to the available neighboring samples.

Intra prediction unit 304 calculates the second reference samples according to the first samples. A value of a second reference sample is set equal to a weighted sum of two or more samples in the first reference samples which are in the same row or column as that of the second reference sample. Intra prediction unit 304 employs equal weights or unequal weights in the calculation of the second reference sample. For example, intra prediction unit 304 sets unequal weights according to the distance between the second reference sample and a sample in the first reference samples of the same row or column as the second reference sample.

Intra prediction unit 304 determines intra prediction samples of the coding block when using planar mode as interpolation values of the first reference samples and the second reference samples.

The decoder passes the QP and quantized coefficients to scaling unit 305 for the process of inverse quantization and to generate the reconstructed coefficients as output. The decoder feeds the reconstructed coefficients from scaling unit 305 and a transform parameter in the residual parameters (e.g., transform parameter from the output of transform unit 208 in the encoder embodiment shown in FIG. 2) into transform unit 306. In some embodiments, if the residual parameter indicates to skip scaling in decoding a block, the decoder guides the coefficients in the residual parameter to transform unit 306 by bypassing scaling unit 305.

Transform unit 306 performs transform operations on the input coefficients following a transform process specifies in a standard. Transform matrix used in transform unit 306 is the same as that used in inverse transform unit 211 in the encoder shown in FIG. 2. The output of transform unit 306 is a reconstructed residual of the decoding block.

In some embodiments, the methods and the related matrices in the decoding process are referred to as "transform methods (or processes)" and "transform matrices," respectively. With regard to notation, this embodiment may be referred to as an "inverse transform unit" based on the consideration of interpreting the decoding process as an inverse process of the encoding process.

Adder 307 takes the reconstructed residual in output of transform unit 306 and the prediction samples in output of prediction unit 302 as input data, and calculates reconstructed samples of the decoding block. Adder 307 stores the reconstructed samples into a picture buffer. In some embodiments, the decoder allocates a picture buffer to (temporally) store output data of adder 307. In other embodiments, the decoder reserves a special picture buffer in DPB 309 to store the data from adder 307.

The decoder passes filtering parameter from parsing unit 301 to filtering unit 308. The filtering parameter for filtering 308 is identical to the filtering parameter in the output of filtering unit 213 in the encoder embodiment shown in FIG. 2. The filtering parameter includes indication information of one or more filters to be used, filter coefficients and filtering control parameters. Filtering unit 308 performs filtering process using the filtering parameter on reconstructed samples of a picture stored in decoded picture buffer and outputs a decoded picture. Filtering unit 308 may consist of one filter or several cascading filters. For example, according to H.265/HEVC standard, filtering unit is composed of two cascading filters, e.g. deblocking filter and sample adaptive offset (SAO) filter. In some embodiments, the filtering unit 308 may also include neural network filters.

In some embodiments, filtering unit 308 may start filtering reconstructed samples of a picture when reconstructed samples of all coding blocks in the picture have been stored in decoded picture buffer, which can be referred to as "picture layer filtering". In other embodiments, an alternative implementation (referred to as "block layer filtering") of picture layer filtering for filtering unit 308 includes starting to filter reconstructed samples of a coding block in a picture if the reconstructed samples are not used as reference in decoding all successive coding blocks in the picture. Block layer filtering does not require filtering unit 308 to hold filtering operations until all reconstructed samples of a picture are available, and thus reduces delays among threads in a decoder.

The decoder stores the decoded picture outputted by filtering unit 308 in DPB 309. In some embodiments, the decoder may perform one or more control operations on pictures in DPB 309 according to one or more instructions outputted by parsing unit 301, for example, the duration to store a picture in DPB 309, outputting a picture from DPB 309, and so on.

3 Exemplary Methods and Embodiments for Planar Mode Prediction

Figure 4:
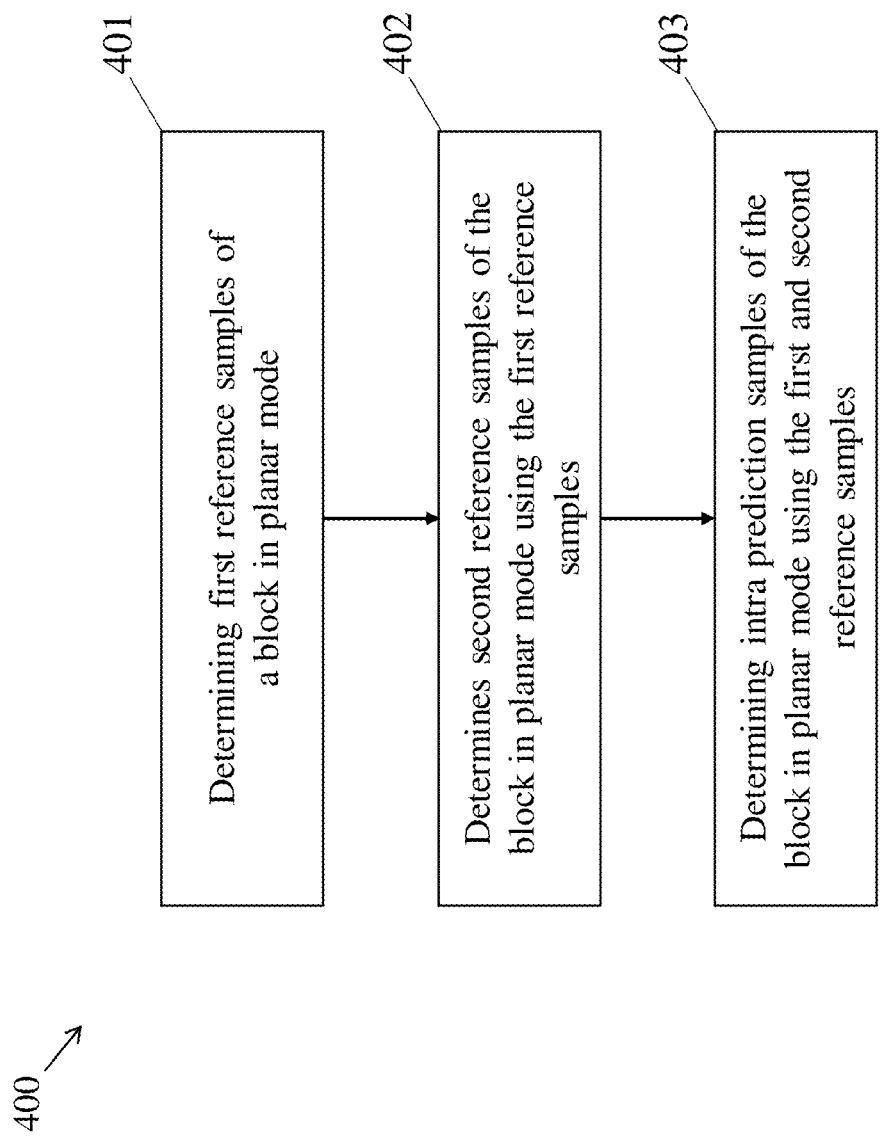
FIG. 4 shows an example flowchart for a method of video coding.

FIG. 4 is a flowchart illustrating an exemplary process (or method) 400 of deriving intra prediction samples of planar mode. In some embodiments, this process can be implemented on intra prediction unit 206 in an encoder to derive prediction samples of a coding block when the encoder determines (or evaluates, for example, in RDO process to determine coding mode of the coding block) to code this coding block using planar mode. In other embodiments, this process can be implemented on intra prediction unit 304 in a decoder to derive prediction samples of a coding block when prediction parameter indicates the decoder to decode the coding block using planar mode.

For embodiments of the disclosed technology, the intra prediction unit 206 and 304 (in FIGS. 2 and 3, respectively) are collectively referred to as "intra Predictor", and "coding block" and "decoding block" as "block".

Method 400 includes step 401, wherein an intra predictor determines first reference samples of a block in planar mode.

In some embodiments, the first reference samples are samples marked as "available samples" for intra prediction process of planar mode. The available samples are reconstructed samples at neighboring positions of the block. When one or more samples at the neighboring positions of the block are not qualified as intra prediction reference (for example, samples outside a current slice containing the block, samples in a block in inter mode when constrained intra mode is in effect), intra predictor may invokes a padding process to derive such samples as copying or interpolation of the reconstructed samples in the same row or column at one or more neighboring positions of the block and marks the derived samples as "available".

Method 400 includes step 402, wherein the intra predictor determines second reference samples of the block in planar mode using the first reference samples, where the second reference samples are on the opposite neighboring sides of the block to the first neighboring samples.

For example, if the first reference samples are top and left neighboring samples of the block, the second reference samples will be bottom and right neighboring samples of the block. In some embodiments, the first reference samples may also include the top-left neighboring sample, and the second reference samples may also include the bottom-right neighboring sample.

The intra predictor calculates the second reference samples based on the first samples. A value of a second reference sample is set equal to a weighted sum of two or more samples in the first reference samples which are in the same row or column as that of the second reference sample. The intra predictor may employ equal weights or unequal weights in the calculation of the second reference sample. For example, intra predictor may use unequal weights based on the distance between the second reference sample and a sample in the first reference samples of the same row or column as the second reference sample.

The method includes step 403, wherein the intra predictor determines intra prediction samples of the block in planar mode using the first and second reference samples.

In some embodiments, the intra predictor computes a sample in the block as an interpolation of the first reference samples and the second reference samples. For example, a value of the sample in the block is set equal to a weighted sum of the samples in the same row and column in the first and second reference samples. In some embodiments, equal weights may be employed. In other embodiments, unequal weights may be used, and which are based on the distance between the sample in the block and each reference sample in the same row or column as the sample.

Figure 5A:
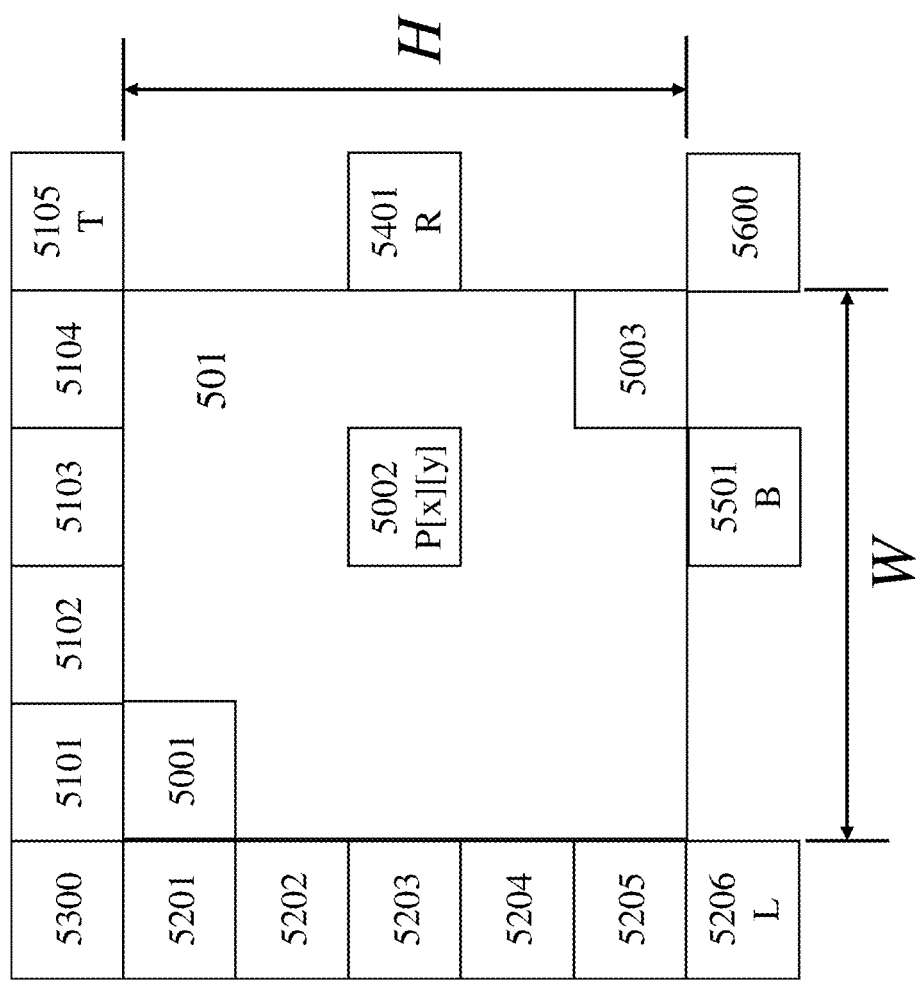
FIGS. 5A and 5B show an exemplary embodiment for deriving intra prediction samples when the intra prediction mode for a coding block is the planar mode.

FIG. 5A is a diagram illustrating neighboring samples used in the derivation of intra prediction samples of planar mode in a first implementation. As shown therein, block 501 is a block with its top-left sample being sample 5001 (e.g. p[0][0]) and its bottom-right sample being sample 5003 (e.g. p[W−1][H−1]). W and H are width and height of the block, respectively, measured in number of samples (or pixels). Sample 5002, also marked as p[x][y] for x being equal to 0, 1, . . . , W−1 and y being equal to 0, 1, . . . H−1, is a sample in the block to be predicted. Sample 5300 (e.g. p[−1][−1]) is a top-left neighboring sample of the block. Samples 5101 (e.g. p[0][−4])~5105 (e.g. p[W][−1], also marked as sample "T") are top neighboring samples of the block. Samples 5201 (e.g. p[−1][0])~5206 (e.g. p[−1][H], also marked as sample "L") are left neighboring samples of the block. Sample 5401 (e.g. P[W][y], also marked as sample "R") is a right neighboring sample of the block. Sample 5501 (e.g. P[x][H], also marked as sample "B") is a bottom neighboring sample of the block. Sample 5600 (e.g. p[W][H]) is a bottom-right neighboring sample of the block.

In some embodiments, the top and left neighboring samples of the block can be collectively referred to as first reference samples. In other embodiments, the top-left sample 5300 may also be included in the first reference samples. For example, the first reference samples contain the available neighboring samples of the block. The right and bottom neighboring samples of the block can be collectively referred to as second reference samples. In some embodiments, the bottom-right sample 5600 may also be included in the second reference samples. For example, the second reference samples contain the reference samples to be derived using the available reference samples. The second reference samples are located on the corresponding opposite sides of the first reference samples of the block.

In some embodiments, the intra predictor calculates the prediction value of sample 5002 using a right neighboring sample R and a left neighboring sample p[−1][y] (e.g. sample 5203 in FIG. 5A) in the same row as sample 5002 and a bottom neighboring sample B and a top neighboring sample p[x][−1] (e.g. sample 5103 in FIG. 5A) in the same column as sample 5002.

The intra predictor calculates the second reference samples based on the first samples. The intra predictor calculates the right neighboring sample R using equation (1) (or an equivalent implementation of equation (1) using adding and bit-wise arithmetic shifting operations). In equation (1), the weights of samples in the first reference samples are determined based on their distances to the right neighboring samples.

$$p[W][y] = \frac{W}{W+y+1} \cdot p[W][-1] + \frac{y+1}{W+y+1} \cdot p[-1][y] \quad (1)$$

The intra predictor calculates the bottom neighboring sample L using equation (2) (or an equivalent implementation of equation (2) using adding and bit-wise arithmetic shifting operations). In equation (2), the weights of samples in the first reference samples are determined based on their distances to the bottom neighboring samples.

$$p[x][H] = \frac{H}{H+x+1} \cdot p[-1][H] + \frac{x+1}{H+x+1} \cdot p[x][-1] \quad (2)$$

The intra predictor calculates the sample to be predicted (e.g. p[x][y]) as a weighted sum of the samples in the first reference samples and the second reference samples. In some embodiments, p[x][y] can be an average of p[x][−1], p[−1][y], p[W][y] and p[x][H], which employs equal weights. In other embodiments, unequal weights for the reference samples can be used based on their respective distances to p[x][y]. An example is shown by equation (3) (or an equivalent implementation of equation (3) using adding and bit-wise arithmetic shifting operations).

$$p[x][y] = \frac{W-(x+1)}{W+H} \cdot p[-1][y] + \\ \frac{x+1}{W+H} \cdot p[W][y] + \frac{H-(y+1)}{W+H} \cdot p[x][-1] + \frac{y+1}{W+H} \cdot p[x][H] \quad (3)$$

Another example is shown by equation (4) (or an equivalent implementation of equation (4) using adding and bit-wise arithmetic shifting operations).

$$p[x][y] = \frac{1}{2} \cdot (p_h[x][y] + p_v[x][y]) \quad (4)$$

Herein, $$\begin{cases} p_h[x][y] = \frac{W-(x+1)}{W} \cdot p[-1][y] + \frac{x+1}{W} \cdot p[W][y] \\ p_v[x][y] = \frac{H-(y+1)}{H} \cdot p[x][-1] + \frac{y+1}{H} \cdot p[x][H] \end{cases}.$$

Figure 5B:
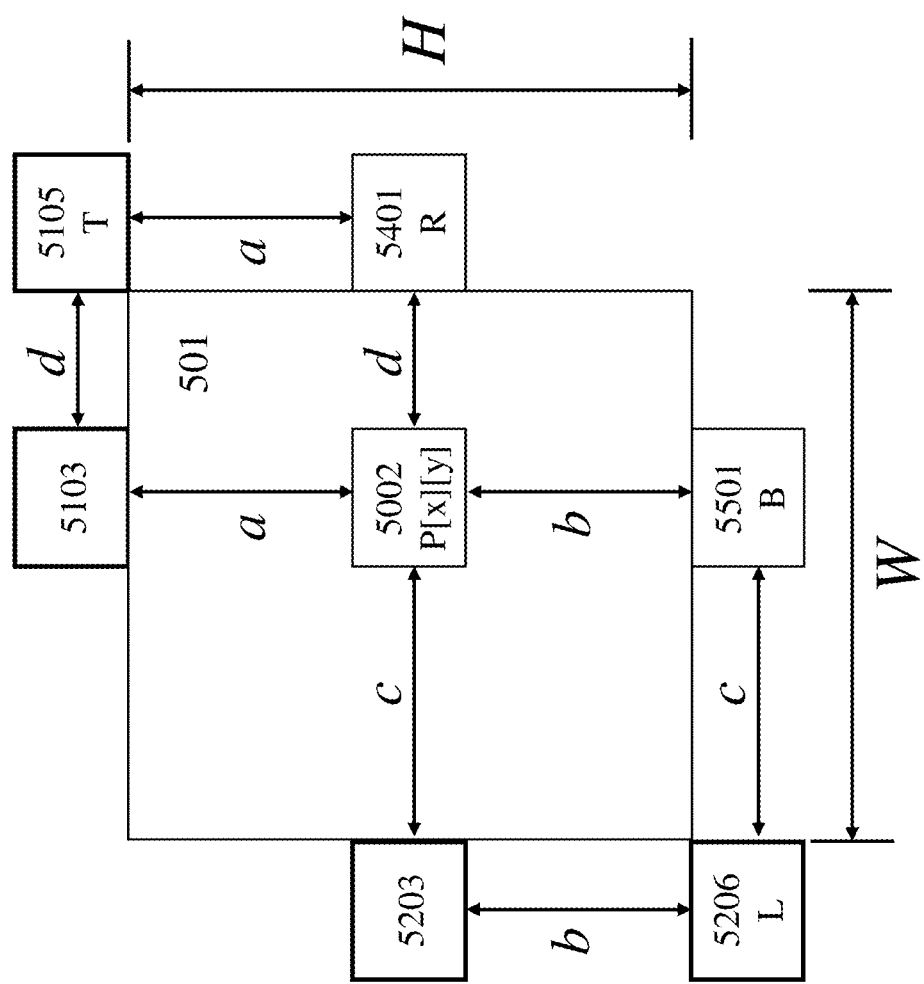

FIG. 5B is a diagram illustrating only those samples that are used, in an example, to derive the value of the prediction sample 5002.

Figure 6:
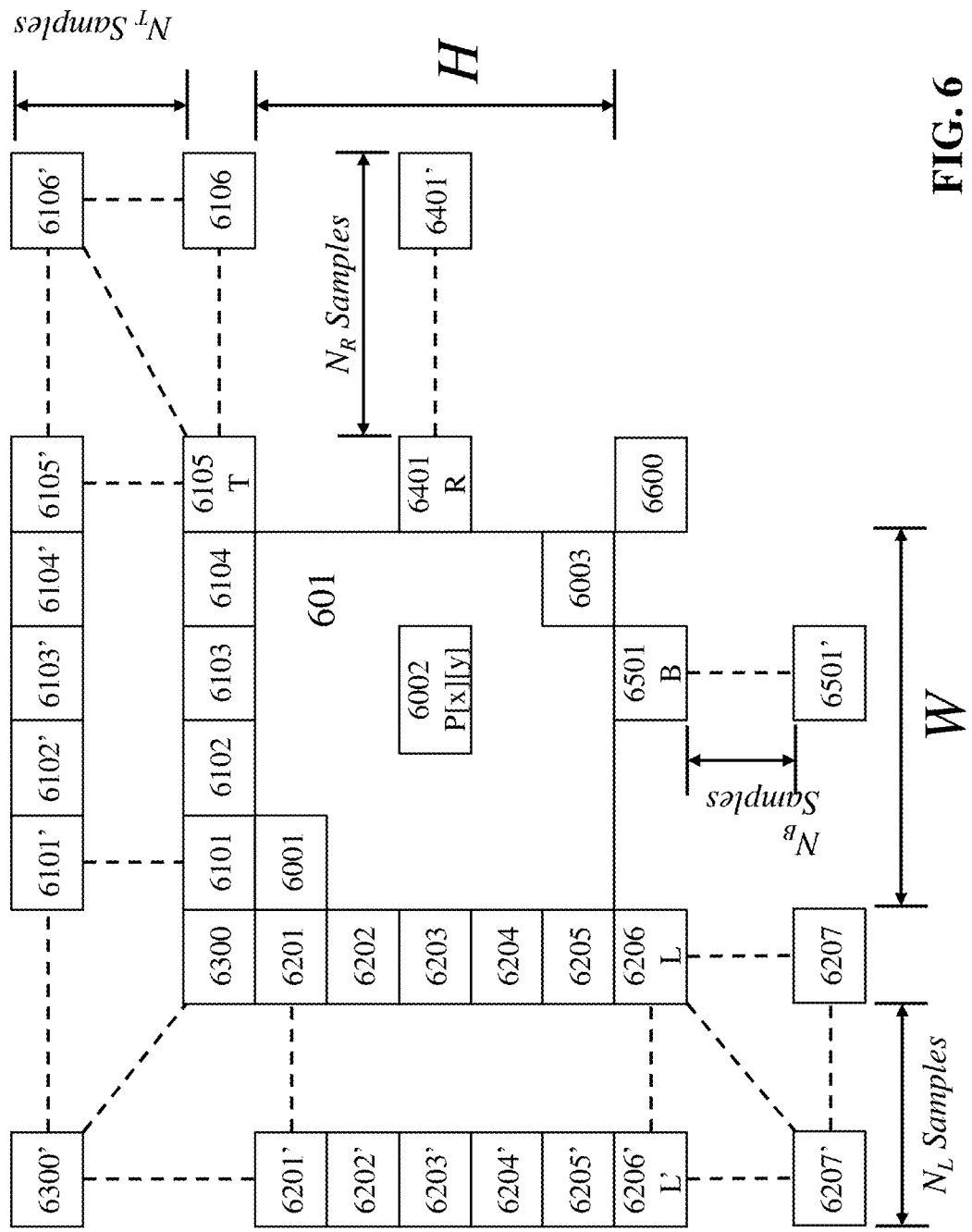
FIG. 6 shows another exemplary embodiment for deriving intra prediction samples when the intra prediction mode for a coding block is the planar mode.

FIG. 6 is a diagram illustrating neighboring samples used in the derivation of intra prediction samples of Planar mode in a second implementation. As shown therein, block 601 is a block with its top-left sample being sample 6001 (e.g. p[0][0]) and its bottom-right sample being sample 6003 (e.g. p[W−1][H−1]). W and H are width and height of the block, respectively, measured in number of samples (or pixels). Sample 6002, also marked as p[x][y] for x being equal to 0, 1, . . . , W−1 and y being equal to 0, 1, . . . H−1, is a sample in the block to be predicted.

In FIG. 6, samples 6101 (e.g. p[0][−1])~6105 (e.g. p[W][−1], also marked as sample "T") are top neighboring samples of the block. From sample 6105 (e.g. p[W][−1]) to left direction, there are another $N_R$ top neighboring samples in the same row as sample 6105, e.g., samples p[W+1][−1], . . . , p[W+$N_R$][−1] (e.g. sample 6106 is p[W+$N_R$][−1]). Besides samples 6101 (e.g. p[0][−1])~6106 (e.g. p[W+$N_R$][−1]), $N_T$ additional lines of top neighboring samples are employed in deriving the intra prediction samples of block 601. Samples 6101' ~6106' are samples p[0][−1−$N_T$], p[1][−1−$N_T$], . . . , p[W+$N_R$][−1−$N_T$].

In FIG. 6, samples 6201 (e.g. p[4][0])~6206 (e.g. p[−1][H], also marked as sample "L") are left neighboring samples of the block. From sample 6206 (e.g. p[−1][H]) to bottom direction, there are another $N_B$ left neighboring samples in the same column as sample 6206, e.g., samples p[−1][H+1], . . . , p[−1][H+$N_B$] (e.g. sample 6207 is p[−1][H+$N_B$]). Besides samples 6201 (e.g. p[−1][0])~6207 (e.g. p[−1][H+$N_B$]), $N_L$ additional columns of left neighboring samples are employed in deriving the intra prediction samples of block 601. Samples 6201' ~6207' are samples p[−1−$N_L$][0], p[−1−$N_L$][−1], . . . , p[−1−$N_L$][H+$N_B$].

In FIG. 6, sample 6300 (e.g. p[−1][−1]) is a top-left neighboring sample of the block. After more top and left neighboring samples are involved in in deriving the intra prediction samples of block 601, top left neighboring samples may include samples from 6300 to 6300', e.g., samples p[−1][−1], p[−1][−2], p[−2][−1], p[−2][−2], . . . , p[−1−$N_L$][−1−$N_T$].

In FIG. 6, sample 6401 (e.g. P[W][y], also marked as sample "R") is a right neighboring sample of the block. Samples p[W+1][y], . . . , p[W+$N_R$][y] (e.g. sample 6401' is p[W+$N_R$][y]) are another $N_R$ right neighboring samples in the same row as sample 6401. Sample 6501 (e.g. P[x][H], also marked as sample "B") is a bottom neighboring sample of the block. Samples p[x][H+1], . . . , p[x][H+$N_B$] (e.g. sample 6501' is p[x][H+$N_B$]) are another $N_B$ bottom neighboring samples in the same column as sample 6501. Sample 6600 (e.g. p[W][H]) is a bottom-right neighboring sample of the block.

In this embodiment, the top and left neighboring samples of the block can be collectively referred to as first reference samples. In some embodiments, the top-left samples 6300~6300' may also be included in first reference samples. For example, the first reference samples contain the available neighboring samples of the block. The right and bottom neighboring samples of the block can be collectively referred to as second reference samples. In other embodiments, the bottom-right sample 6600 may also be included in second reference samples. For example, the second reference samples contain the reference samples to be derived using the available reference samples. The second reference samples are located on the corresponding opposite sides of the first reference samples of the block.

In some embodiments, the intra predictor calculates prediction sample of sample 6002 using right neighboring samples and left neighboring samples in the same row as sample 6002, and bottom neighboring samples and top neighboring samples in the same column as sample 6002.

The intra predictor calculates the second reference samples based on the first samples. n some embodiments, and to reduce the computational complexity of the intra predictor, $N_T$, and $N_L$ are equal (for example a positive integer M), and $N_R$, and $N_B$ are equal (for example a non-negative integer N). For example, when M is equal to 1 and N is equal to 0, the method described in this embodiment resembles that described in the context of FIG. 5A.

The intra predictor calculates the right neighboring samples using equation (5) (or an equivalent implementation of equation (5) using adding and bit-wise arithmetic shifting operations), wherein i=0, 1, . . . , N. In equation (5), the weights of samples in the first reference samples are based on their respective distances to the right neighboring samples in calculating $p_j$.

$$p[W+i][y] = \sum_{j=0}^{M}(a_j \cdot p_j) \quad (5)$$

Herein, $$p_j = \frac{W+j}{(W+j)+(y+j+1)} \cdot p[W+i][-1-j] + \frac{y+j+1}{(W+j)+(y+j+1)} p[-1-j][y].$$

In the case of equal weights, $$a_j = \frac{1}{M},$$

and the case or unequal weights, $$a_j = \frac{M-j}{\sum_{k=0}^{M}(k+1)}.$$

The intra predictor calculates the bottom neighboring samples using equation (6) (or an equivalent implementation of equation (6) using adding and bit-wise arithmetic shifting operations), wherein i=0, 1, . . . , N. In equation (6), the weights of samples in the first reference samples are based on their distances to the bottom neighboring samples in calculating $p_j$.

$$p[x][H+i] = \sum_{j=0}^{M}(a_j \cdot p_j) \quad (6)$$

Herein, $$p_j = \frac{H+j}{(H+j)+(x+j+1)} \cdot p[-1-j][H+i] + \frac{x+j+1}{(H+j)+(x+j+1)} p[x][-1-j]$$

In the case of equal weights, $$a_j = \frac{1}{M},$$

and in the case or unequal weights $$a_j = \frac{M-j}{\sum_{k=0}^{M}(k+1)}.$$

In some embodiments, the intra predictor calculates the sample to be predicted (e.g. p[x][y]) as a weighted sum of the samples in the first reference samples and the second reference samples. In other embodiments, when equal weights applied, p[x][y] can be a numerical average of samples in the first reference samples and the second reference samples in the same row or column, that is, samples 6401~6401', 6203~6203', 6103~6103' and 6501~6501' as shown in FIG. 6. In yet other embodiments, unequal weights can be based on their distances to p[x][y]. An example is shown by equation (7) (or an equivalent implementation of equation (7) using adding and bit-wise arithmetic shifting operations).

$$p[x][y] = \frac{y+1}{x+1+y+1} \cdot p_h[x][y] + \frac{x+1}{x+1+y+1} \cdot p_v[x][y] \quad (7)$$

Herein, $$p_h[x][y] = \sum_{j=0}^{M} \left\{ \frac{M-j}{\sum_{k=0}^{M}(k+1)} \cdot \sum_{h=0}^{N} \left[ \frac{M-h}{\sum_{k=0}^{N}(k+1)} \right. \right.$$
$$\left. \left. \left( \frac{(j+1+x+1) \cdot p[W+h][y] + (W-x-1+h) \cdot p[-1-j][y]}{W+h+j+1} \right) \right] \right\}$$

And $$p_v[x][y] = \sum_{j=0}^{M} \left\{ \frac{M-j}{\sum_{k=0}^{M}(k+1)} \cdot \sum_{h=0}^{N} \left[ \frac{M-h}{\sum_{k=0}^{N}(k+1)} \right. \right.$$
$$\left. \left. \left( \frac{(j+1+y+1) \cdot p[x][H+h] + (H-y-1+h) \cdot p[x][-1-j]}{H+h+j+1} \right) \right] \right\}$$

Figure 7:
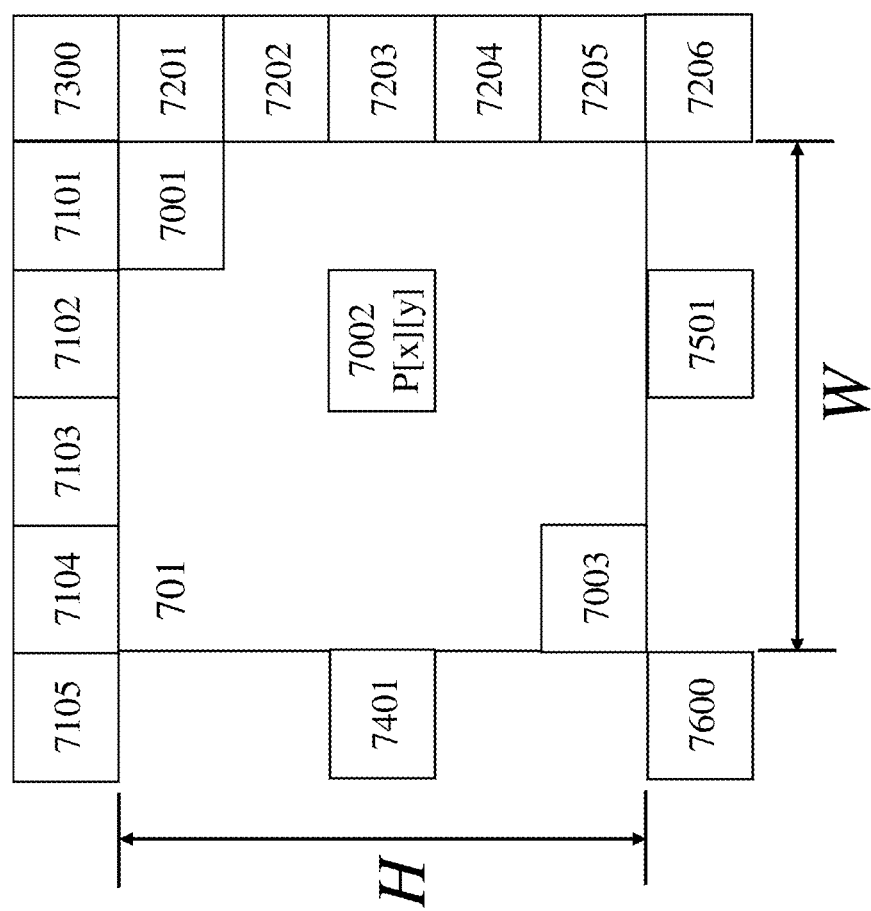
FIG. 7 shows yet another exemplary embodiment for deriving intra prediction samples when the intra prediction mode for a coding block is the planar mode.

FIG. 7 is a diagram illustrating neighboring samples used in the derivation of intra prediction samples of planar mode in another implementation.

In some embodiments, and when an encoder adopts a special coding order and a decoder uses a corresponding decoding order, top and right neighboring samples will be reconstructed before coding or decoding the block. In this case, top and right neighboring samples of the block are employed to derive intra prediction samples of the block.

The intra predictor employs a method described in the present document to determine intra prediction samples of the block 701 if an intra prediction mode of the block 701 is planar mode.

In FIG. 7, block 701 is a block with its top-right sample being sample 7001 (e.g. p[0][0]) and its bottom-left sample being sample 7003 (e.g. p[W−1][H−1]). W and H are width and height of the block, respectively, measured in number of samples (or pixels). Sample 7002, also marked as p[x][y] for x being equal to 0, 1, . . . , W−1 and y being equal to 0, 1, . . . H−1, is a sample in the block to be predicted. Sample 7300 (e.g. p[−1][−1]) is a top-right neighboring sample of the block. Samples 7101 (e.g. p[0][−1])~7105 (e.g. p[W][−1]) are top neighboring samples of the block. Samples 7201 (e.g. p[4][0])~7206 (e.g. p[−1][H]) are right neighboring samples of the block. Sample 7401 (e.g. P[W][y]) is a left neighboring sample of the block. Sample 7501 (e.g. P[x][H]) is a bottom neighboring sample of the block. Sample 7600 (e.g. p[W][H]) is a bottom-left neighboring sample of the block.

In this exemplary embodiment, the top and right neighboring samples of the block can be collectively referred to as first reference samples. In some embodiments, the top-right sample 7300 may also be included in first reference samples. In other words, the first reference samples contains the available neighboring samples of the block. The left and bottom neighboring samples of the block can be collectively referred to as second reference samples. In some embodiments, the bottom-left sample 7600 may also be included in second reference samples. In other words, the second reference samples contains the reference samples to be derived using the available reference samples. The second reference samples are located on the corresponding opposite sides of the first reference samples of the block.

The intra predictor calculates prediction sample of sample 7002 using a left neighboring sample 7401 and a right neighboring sample p[−1][y] (e.g. sample 7203 in FIG. 7) in the same row as sample 7002 and a bottom neighboring sample 7501 and a top neighboring sample p[x][−1] (e.g. sample 7103 in FIG. 7) in the same column as sample 7002.

In some embodiments, equations (1)~(4) are used to calculate intra prediction samples of the block in planar mode. The intra predictor calculates the second reference samples based on the first samples. The intra predictor calculates the left neighboring sample 7401 using equation (1) (or an equivalent implementation of equation (1) using adding and bit-wise arithmetic shifting operations). In equation (1), the weights of samples in the first reference samples are based on their distances to the left neighboring samples.

The intra predictor calculates the bottom neighboring sample 7501 using equation (2) (or an equivalent implementation of equation (2) using adding and bit-wise arithmetic shifting operations). In equation (2), the weights of samples in the first reference samples are based on their distances to the bottom neighboring samples.

In some embodiments, the intra predictor calculates the sample to be predicted (e.g. p[x][y]) as a weighted sum of the samples in the first reference samples and the second reference samples. In other embodiments, p[x][y] can be a numerical average of p[x][−1], p[−1][y], p[W][y] and p[x][H], which employs equal weights. In yet other embodiments, unequal weights for the reference samples can be based on their distances to p[x][y]. An example is shown by equation (3) (or an equivalent implementation of equation (3) using adding and bit-wise arithmetic shifting operations). Another example is shown by equation (4) (or an equivalent implementation of equation (4) using adding and bit-wise arithmetic shifting operations).

Figure 8:
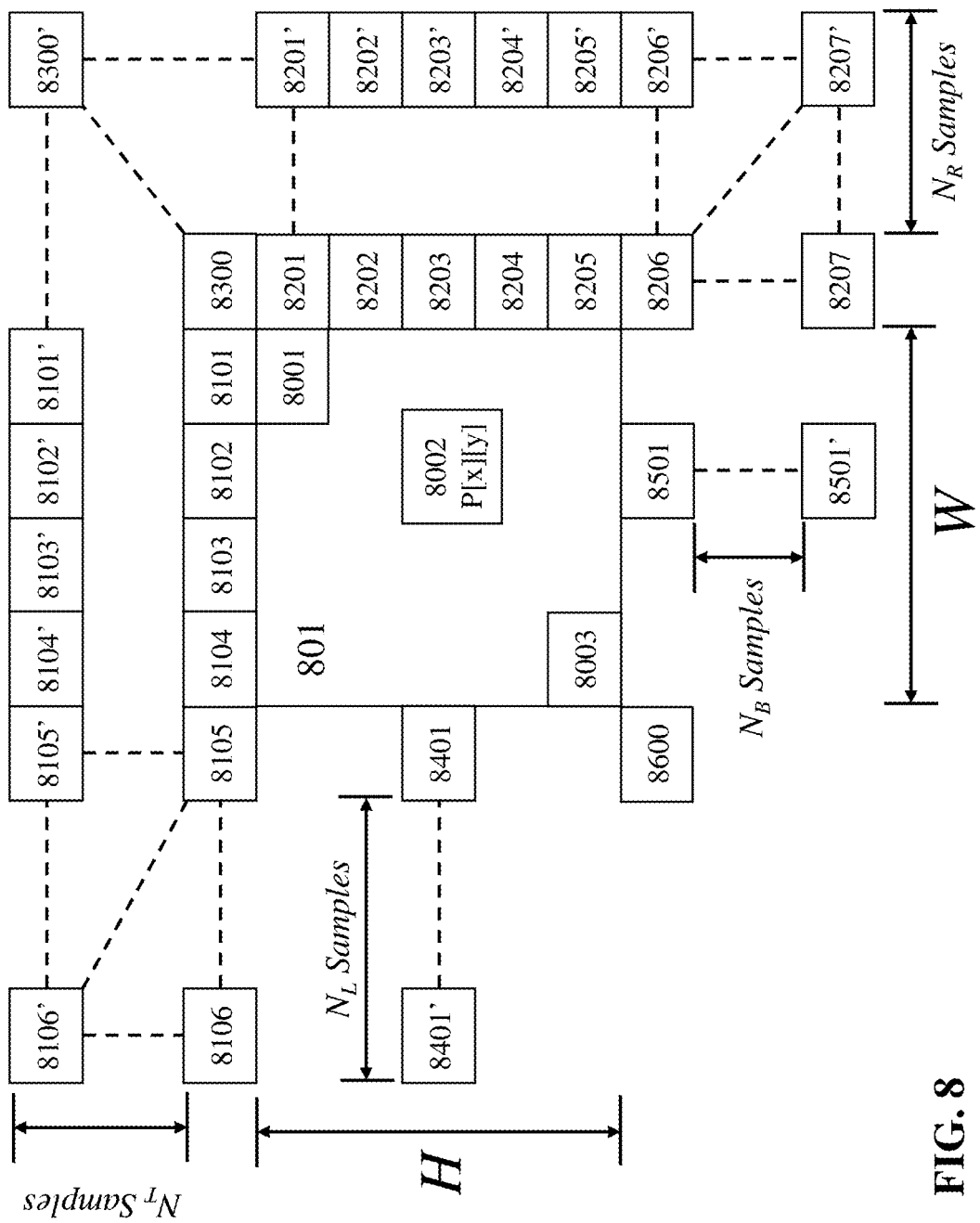
FIG. 8 shows yet another exemplary embodiment for deriving intra prediction samples when the intra prediction mode for a coding block is the planar mode.

FIG. 8 is a diagram illustrating neighboring samples used in the derivation of intra prediction samples of planar mode in yet another implementation.

In some embodiments, and when an encoder adopts a special coding order and a decoder uses a corresponding decoding order, top and right neighboring samples will be reconstructed before coding or decoding the block. In this case, top and right neighboring samples of the block are employed to derive intra prediction samples of the block.

The intra predictor employs a method described in the present document to determine intra prediction samples of the block 801 if an intra prediction mode of the block 801 is planar mode.

In FIG. 8, block 801 is a block with its top-right sample being sample 8001 (e.g. p[0][0]) and its bottom-left sample being sample 8003 (e.g. p[W−1][H−1]). W and H are width and height of the block, respectively, measured in number of samples (or pixels). Sample 8002, also marked as p[x][y] for x being equal to 0, 1, . . . , W−1 and y being equal to 0, 1, . . . H−1, is a sample in the block to be predicted.

In FIG. 8, samples 8101 (e.g. p[0][−1])~8105 (e.g. p[W][−1]) are top neighboring samples of the block. From sample 8105 (e.g. p[W][−1]) to left direction, there are another $N_L$ top neighboring samples in the same row as sample 8105, that is, samples p[W+1][−1], . . . , p[W+$N_L$][−1] (e.g. sample 8106 is p[W+$N_L$][−1]). Besides samples 8101 (e.g. p[0][−1])~8106 (e.g. p[W+$N_L$][−1]), $N_T$ additional lines of top neighboring samples are employed in deriving the intra prediction samples of block 801. Samples 8101'~8106' are samples p[0][−1−$N_T$], p[1][−1−$N_T$], . . . , p[W+$N_L$][−1−$N_T$].

In FIG. 8, samples 8201 (e.g. p[4][0])~8206 (e.g. p[−1][H]) are right neighboring samples of the block. From sample 8206 (e.g. p[−1][H]) to bottom direction, there are another $N_B$ right neighboring samples in the same column as sample 8206, that is, samples p[−1][H+1], . . . , p[−1][H+$N_B$] (e.g. sample 8207 is p[−1][H+$N_B$]). Besides samples 8201 (e.g. p[4][0])~8207 (e.g. p[−1][H+$N_B$]), $N_R$ additional columns of right neighboring samples are employed in deriving the intra prediction samples of block 801. Samples 8201'~8207' are samples p[−1−$N_R$][0], p[−1−$N_R$][−1], . . . , p[−1−$N_R$][H+$N_B$].

In FIG. 8, sample 8300 (e.g. p[−1][−1]) is a top-right neighboring sample of the block. After more top and right neighboring samples are involved in in deriving the intra prediction samples of block 801, top-right neighboring samples may include samples from 8300 to 8300', that is, samples p[−1][−1], p[−1][−2], p[−2][−1], p[−2][−2], . . . , p[−1−$N_R$][−1−$N_T$].

In FIG. 8, sample 8401 (e.g. P[W][y]) is a left neighboring sample of the block. Samples p[W+1][y], . . . , p[W+$N_L$][y] (e.g. sample 8401' is p[W+$N_L$][y]) are another $N_L$ left neighboring samples in the same row as sample 8401. Sample 8501 (e.g. P[x][H]) is a bottom neighboring sample of the block. Samples p[x][H+1], . . . , p[x][H+$N_B$] (e.g. sample 8501' is p[x][H+$N_B$]) are another $N_B$ bottom neighboring samples in the same column as sample 8501. Sample 8600 (e.g. p[W][H]) is a bottom-left neighboring sample of the block.

In some embodiments, the top and right neighboring samples of the block can be collectively referred to as first reference samples. In other embodiments, the top-right samples 8300~8300' may also be included in first reference samples. In other words, the first reference samples contains the available neighboring samples of the block. The left and bottom neighboring samples of the block can be collectively referred to as second reference samples. In yet other embodiments, the bottom-left sample 8600 may also be included in second reference samples. In other words, the second reference samples contains the reference samples to be derived using the available reference samples. The second reference samples are located on the corresponding opposite sides of the first reference samples of the block.

The intra predictor calculates prediction sample of sample 8002 using right neighboring samples and left neighboring samples in the same row as sample 8002, and bottom neighboring samples and top neighboring samples in the same column as sample 8002.

The intra predictor calculates the second reference samples based on the first samples. In some embodiments, and to reduce the computational complexity of the intra predictor, $N_T$, and $N_R$ are equal (for example a positive integer M), and $N_L$, and $N_B$ are equal (for example a non-negative integer/V). In some embodiments, when M is equal to 1 and N is equal to 0, the method described in this embodiment is similar to that described in the context of FIG. 7.

In some embodiments, equations (5)~(7) are used to calculate intra prediction samples of the block in planar mode. The intra predictor calculates the left neighboring samples using equation (5) (or an equivalent implementation of equation (5) using adding and bit-wise arithmetic shifting operations), wherein i=0, 1, . . . , N. In equation (5), the weights of samples in the first reference samples are based on their distances to the left neighboring samples in calculating $p_j$.

The intra predictor calculates the bottom neighboring samples using equation (6) (or an equivalent implementation of equation (6) using adding and bit-wise arithmetic shifting operations), wherein i=0, 1, . . . , N. In equation (6), the weights of samples in the first reference samples are based on their distances to the bottom neighboring samples in calculating $p_j$.

In some embodiments, the intra predictor calculates the sample to be predicted (e.g. p[x][y]) as a weighted sum of the samples in the first reference samples and the second reference samples. In other embodiments, when equal weights applied, p[x][y] can be a numerical average of samples in the first reference samples and the second reference samples in the same row or column, that is, samples 8401~8401', 8203~8203', 8103~8103' and 8501~8501' as shown in FIG. 8. In yet other embodiments, unequal weights can be based on their distances to p[x][y]. An example is shown by equation (7) (or an equivalent implementation of equation (7) using adding and bit-wise arithmetic shifting operations).

Figure 9:
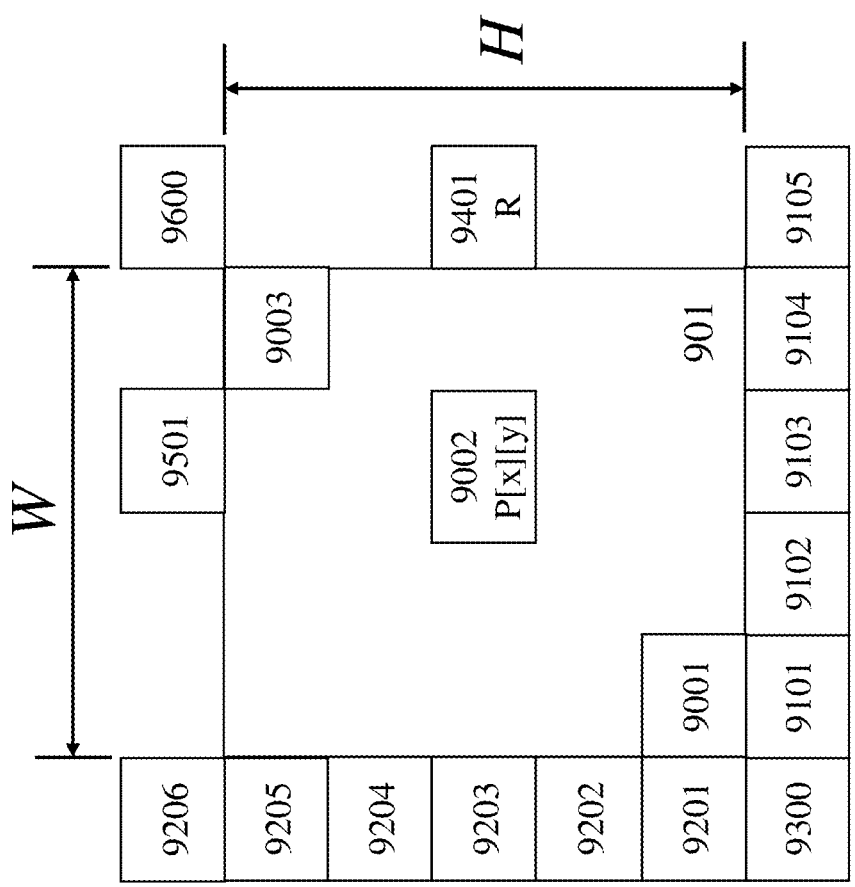
FIG. 9 shows yet another exemplary embodiment for deriving intra prediction samples when the intra prediction mode for a coding block is the planar mode.

FIG. 9 is a diagram illustrating neighboring samples used in the derivation of intra prediction samples of planar mode in yet another implementation.

In some embodiments, and when an encoder adopts a special coding order and a decoder uses a corresponding decoding order, bottom and left neighboring samples will be reconstructed before coding or decoding the block. In this case, bottom and left neighboring samples of the block are employed to derive intra prediction samples of the block.

The intra predictor employs a method described in the present document to determine intra prediction samples of the block 901 if an intra prediction mode of the block 901 is planar mode.

In FIG. 9, block 901 is a block with its bottom-left sample being sample 9001 (e.g. p[0][0]) and its top-right sample being sample 9003 (e.g. p[W−1][H−1]). W and H are width and height of the block, respectively, measured in number of samples (or pixels). Sample 9002, also marked as p[x][y] for x being equal to 0, 1, . . . , W−1 and y being equal to 0, 1, . . . H−1, is a sample in the block to be predicted. Sample 9300 (e.g. p[−1][−1]) is a bottom-left neighboring sample of the block. Samples 9101 (e.g. p[0][−1])~9105 (e.g. p[W][−1]) are bottom neighboring samples of the block. Samples 9201 (e.g. p[4][0])~9206 (e.g. p[−1][H]) are left neighboring samples of the block. Sample 9401 (e.g. P[W][y]) is a right neighboring sample of the block. Sample 9501 (e.g. P[x]

[H]) is a top neighboring sample of the block. Sample 9600 (e.g. p[W][H]) is a top-right neighboring sample of the block.

In some embodiments, the bottom and left neighboring samples of the block can be collectively referred to as first reference samples. In other embodiments, the bottom-left sample 9300 may also be included in first reference samples. In other words, the first reference samples contains the available neighboring samples of the block. The top and right neighboring samples of the block can be collectively referred to as second reference samples. In some embodiments, the top-right sample 9600 may also be included in second reference samples. In other words, the second reference samples contains the reference samples to be derived using the available reference samples. The second reference samples are located on the corresponding opposite sides of the first reference samples of the block.

The intra predictor calculates prediction sample of sample 9002 using a right neighboring sample 9401 and a left neighboring sample p[−1][y] (e.g. sample 9203 in FIG. 9) in the same row as sample 9002 and a top neighboring sample 9501 and a bottom neighboring sample p[x][−1] (e.g. sample 9103 in FIG. 9) in the same column as sample 9002.

In some embodiments, equations (1)~(4) are used to calculate intra prediction samples of the block in planar mode. The intra predictor calculates the second reference samples based on the first samples. Intra predictor calculates the right neighboring sample 9401 using equation (1) (or equivalent implementation of equation (1) using adding and bit-wise arithmetic shifting operations). In equation (1), the weights of samples in the first reference samples are based on their distances to the right neighboring samples.

The intra predictor calculates the top neighboring sample 9501 using equation (2) (or an equivalent implementation of equation (2) using adding and bit-wise arithmetic shifting operations). In equation (2), the weights of samples in the first reference samples are based on their distances to the top neighboring samples.

In some embodiments, the intra predictor calculates the sample to be predicted (e.g. p[x][y]) as a weighted sum of the samples in the first reference samples and the second reference samples. In other embodiments, p[x][y] can be a numerical average of p[x][−1], p[−1][y], p[W][y] and p[x][H], which employs equal weights. In yet other embodiments, unequal weights for the reference samples can be based on their distances to p[x][y]. An example is shown by equation (3) (or an equivalent implementation of equation (3) using adding and bit-wise arithmetic shifting operations). Another example is shown by equation (4) (or an equivalent implementation of equation (4) using adding and bit-wise arithmetic shifting operations).

Figure 10:
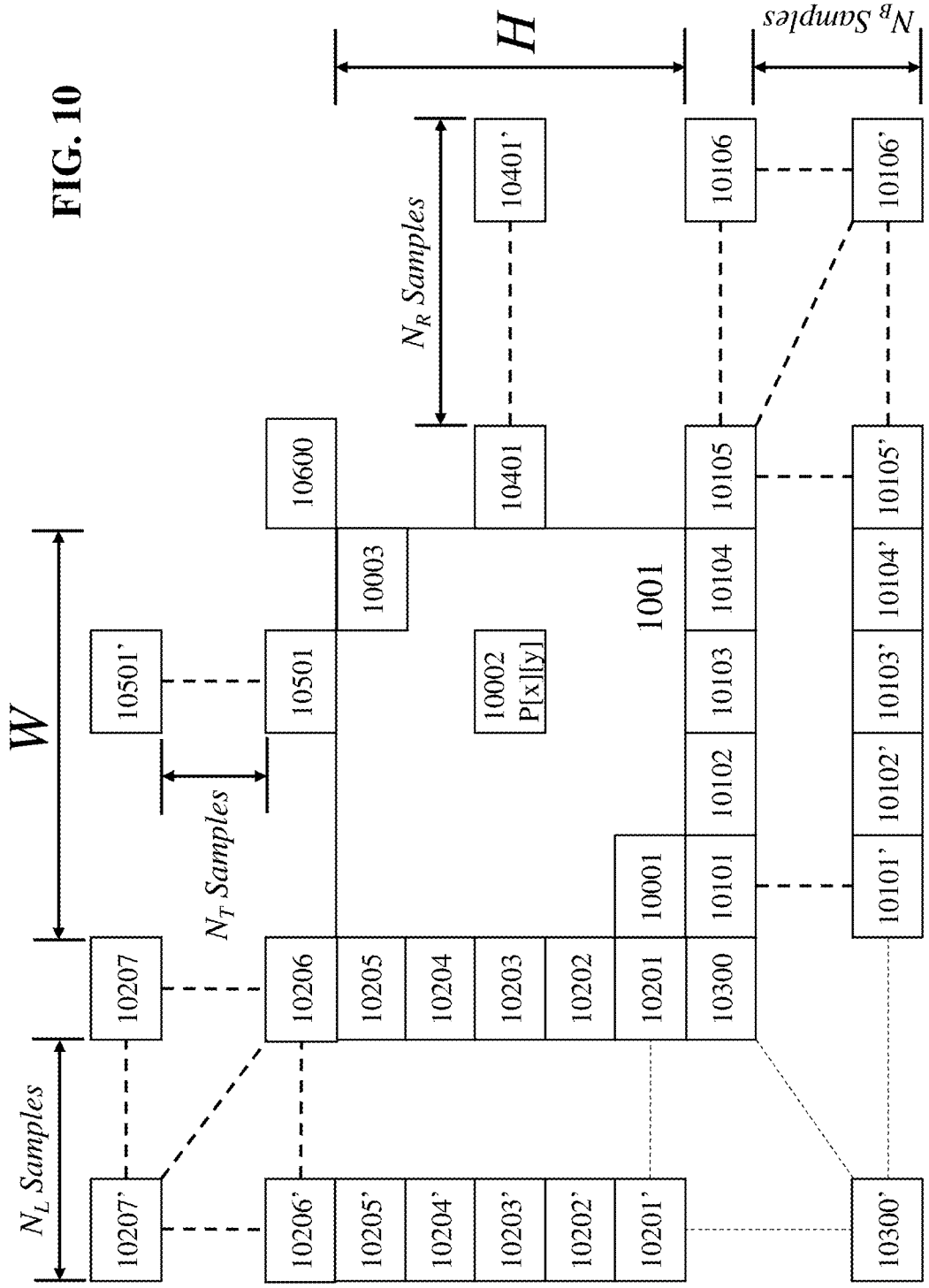
FIG. 10 shows yet another exemplary embodiment for deriving intra prediction samples when the intra prediction mode for a coding block is the planar mode.

FIG. 10 is a diagram illustrating neighboring samples used in the derivation of intra prediction samples of planar mode in yet another implementation.

In some embodiments, and when an encoder adopts a special coding order and a decoder uses a corresponding decoding order, bottom and left neighboring samples will be reconstructed before coding or decoding the block. In this case, bottom and left neighboring samples of the block are employed to derive intra prediction samples of the block.

The intra predictor employs a method described in the present document to determine intra prediction samples of the block 1001 if an intra prediction mode of the block 1001 is planar mode.

In FIG. 10, block 1001 is a block with its bottom-left sample being sample 10001 (e.g. p[0][0]) and its top-right sample being sample 10003 (e.g. p[W−1][H−1]). W and H are width and height of the block, respectively, measured in number of samples (or pixels). Sample 10002, also marked as p[x][y] for x being equal to 0, 1, . . . , W−1 and y being equal to 0, 1, . . . H−1, is a sample in the block to be predicted.

In FIG. 10, samples 10101 (e.g. p[0][−1])~10105 (e.g. p[W][−1]) are bottom neighboring samples of the block. From sample 10105 (e.g. p[W][−1]) to right direction, there are another $N_R$ bottom neighboring samples in the same row as sample 10105, that is, samples p[W+1][−1], . . . , p[W+$N_R$][−1] (e.g. sample 10106 is p[W+$N_R$][−1]). Besides samples 10101 (e.g. p[0][−1])~10106 (e.g. p[W+$N_R$][−1]), $N_B$ additional lines of bottom neighboring samples are employed in deriving the intra prediction samples of block 1001. Samples 10101' ~10106' are samples p[0][−1−$N_B$], p[1][−1−$N_B$], . . . , p[W+$N_R$][−1−$N_B$].

In FIG. 10, samples 10201 (e.g. p[−1][0])~10206 (e.g. p[−1][H]) are left neighboring samples of the block. From sample 10206 (e.g. p[−1][H]) to top direction, there are another $N_T$ left neighboring samples in the same column as sample 10206, that is, samples p[−1][H+1], . . . , p[−1][H+$N_T$] (e.g. sample 10207 is p[−1][H+$N_T$]). Besides samples 10201 (e.g. p[−1][0])~10207 (e.g. p[−1][H+$N_T$]), $N_L$ additional columns of left neighboring samples are employed in deriving the intra prediction samples of block 1001. Samples 10201' ~10207' are samples p[−1−$N_L$][0], p[−1−$N_L$][1], . . . , p[−1−$N_L$][H+$N_T$].

In FIG. 10, sample 10300 (e.g. p[−1][−1]) is a bottom-left neighboring sample of the block. After more bottom and left neighboring samples are involved in in deriving the intra prediction samples of block 1001, bottom-left neighboring samples may include samples from 10300 to 10300', that is, samples p[−1][−1], p[−1][−2], p[−2][−1], p[−2][−2], . . . , p[−1−$N_L$][−1−$N_B$].

In FIG. 10, sample 10401 (e.g. P[W][y]) is a right neighboring sample of the block. Samples p[W+1][y], . . . , p[W+$N_R$][y] (e.g. sample 10401' is p[W+$N_R$][y]) are another $N_R$ right neighboring samples in the same row as sample 10401. Sample 10501 (e.g. P[x][H]) is a top neighboring sample of the block. Samples p[x][H+1], . . . , p[x][H+$N_T$] (e.g. sample 10501' is p[x][H+$N_T$]) are another $N_T$ top neighboring samples in the same column as sample 10501. Sample 10600 (e.g. p[W][H]) is a top-right neighboring sample of the block.

In some embodiments, the bottom and left neighboring samples of the block can be collectively referred to as first reference samples. In other embodiments, the bottom-left samples 10300~10300' may also be included in first reference samples. In other words, the first reference samples contains the available neighboring samples of the block. The top and right neighboring samples of the block can be collectively referred to as second reference samples. In some embodiments, the top-right sample 10600 may also be included in second reference samples. In other words, the second reference samples contains the reference samples to be derived using the available reference samples. The second reference samples are located on the corresponding opposite sides of the first reference samples of the block.

The intra predictor calculates prediction sample of sample 10002 using right neighboring samples and left neighboring samples in the same row as sample 10002, and bottom neighboring samples and top neighboring samples in the same column as sample 10002.

The intra predictor calculates second reference samples based on the first samples. In some embodiments, and to reduce the computational complexity of the intra predictor, $N_L$ and $N_B$ are equal (for example a positive integer M), $N_T$ and $N_R$ are equal (for example a non-negative integer N). In some embodiments, when M is equal to 1 and N is equal to 0, the method described in this embodiment is similar to that described in the context of FIG. 9.

In some embodiments, equations (5)~(7) are used to calculate intra prediction samples of the block in planar mode. The intra predictor calculates the right neighboring samples using equation (5) (or an equivalent implementation of equation (5) using adding and bit-wise arithmetic shifting operations), wherein i=0, 1, N. In equation (5), the weights of samples in the first reference samples are based on their distances to the right neighboring samples in calculating.

The intra predictor calculates the top neighboring samples using equation (6) (or an equivalent implementation of equation (6) using adding and bit-wise arithmetic shifting operations), wherein i=0, 1, . . . , N. In equation (6), the weights of samples in the first reference samples are based on their distances to the top neighboring samples in calculating.

In some embodiments, the intra predictor calculates the sample to be predicted (e.g. p[x][y]) as a weighted sum of the samples in the first reference samples and the second reference samples. In other embodiments, when equal weights applied, p[x][y] can be a numerical average of samples in the first reference samples and the second reference samples in the same row or column, that is, samples 10401~10401', 10203~10203', 10103~10103' and 10501~10501' as exampled in FIG. 10. In yet other embodiments, unequal weights are based on their distances to p[x][y]. An example is shown by equation (7) (or an equivalent implementation of equation (7) using adding and bit-wise arithmetic shifting operations).

Figure 11:
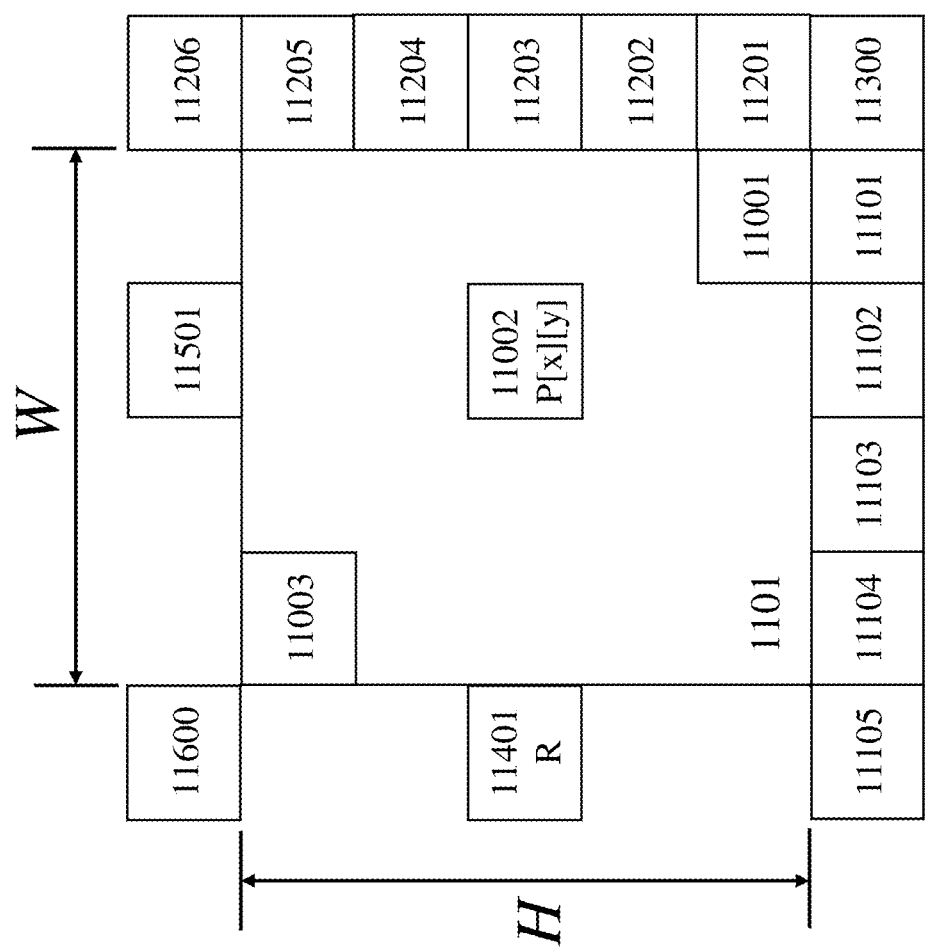
FIG. 11 shows yet another exemplary embodiment for deriving intra prediction samples when the intra prediction mode for a coding block is the planar mode.

FIG. 11 is a diagram illustrating neighboring samples used in the derivation of intra prediction samples of planar mode in yet another implementation.

In some embodiments, and when an encoder adopts a special coding order and a decoder uses a corresponding decoding order, bottom and right neighboring samples will be reconstructed before coding or decoding the block. In this case, bottom and right neighboring samples of the block are employed to derive intra prediction samples of the block.

The intra predictor employs a method described in the present document to determine intra prediction samples of the block 1101 if an intra prediction mode of the block 1101 is planar mode.

In FIG. 11, block 1101 is a block with its bottom-right sample being sample 11001 (e.g. p[0][0]) and its top-left sample being sample 11003 (e.g. p[W−1][H−1]). W and H are width and height of the block, respectively, measured in number of samples (or pixels). Sample 11002, also marked as p[x][y] for x being equal to 0, 1, . . . , W−1 and y being equal to 0, 1, . . . H−1, is a sample in the block to be predicted. Sample 11300 (e.g. p[−1][−1]) is a bottom-right neighboring sample of the block. Samples 11101 (e.g. p[0][−1])~11105 (e.g. p[W][−1]) are bottom neighboring samples of the block. Samples 11201 (e.g. p[4][0])~11206 (e.g. p[−1][H]) are right neighboring samples of the block. Sample 11401 (e.g. P[W][y]) is a left neighboring sample of the block. Sample 11501 (e.g. P[x][H]) is a top neighboring sample of the block. Sample 11600 (e.g. p[W][H]) is a top-left neighboring sample of the block.

In some embodiments, the bottom and right neighboring samples of the block can be collectively referred to as first reference samples. In other embodiments, the bottom-right sample 11300 may also be included in first reference samples. In other words, the first reference samples contains the available reference samples. The top and right neighboring samples of the block can be collectively referred to as second reference samples. In some embodiments, the top-left sample 11600 may also be included in second reference samples. In other words, the second reference samples contains the reference samples to be derived using the available reference samples. The second reference samples are located on the corresponding opposite sides of the first reference samples of the block.

The intra predictor calculates prediction sample of sample 11002 using a left neighboring sample 11401 and a right neighboring sample p[−1][y] (e.g. sample 11203 in FIG. 11) in the same row as sample 11002 and a top neighboring sample 11501 and a bottom neighboring sample p[x][−1] (e.g. sample 11103 in FIG. 11) in the same column as sample 11002.

In some embodiments, equations (1)~(4) are used to calculate intra prediction samples of the block in planar mode. The intra predictor calculates second reference samples based on the first samples. The intra predictor calculates the left neighboring sample 11401 using equation (1) (or an equivalent implementation of equation (1) using adding and bit-wise arithmetic shifting operations). In equation (1), the weights of samples in the first reference samples are based on their distances to the left neighboring samples.

The intra predictor calculates the top neighboring sample 11501 using equation (2) (or an equivalent implementation of equation (2) using adding and bit-wise arithmetic shifting operations). In equation (2), the weights of samples in the first reference samples are based on their distances to the top neighboring samples.

In some embodiments, the intra predictor calculates the sample to be predicted (e.g. p[x][y]) as a weighted sum of the samples in the first reference samples and the second reference samples. In other embodiments, p[x][y] can be a numerical average of p[x][−1], p[−1][y], p[W][y] and p[x][H], which employs equal weights. In yet other embodiments, unequal weights for the reference samples can be based on their distances to p[x][y]. An example is shown by equation (3) (or an equivalent implementation of equation (3) using adding and bit-wise arithmetic shifting operations). Another example is shown by equation (4) (or an equivalent implementation of equation (4) using adding and bit-wise arithmetic shifting operations).

Figure 12:
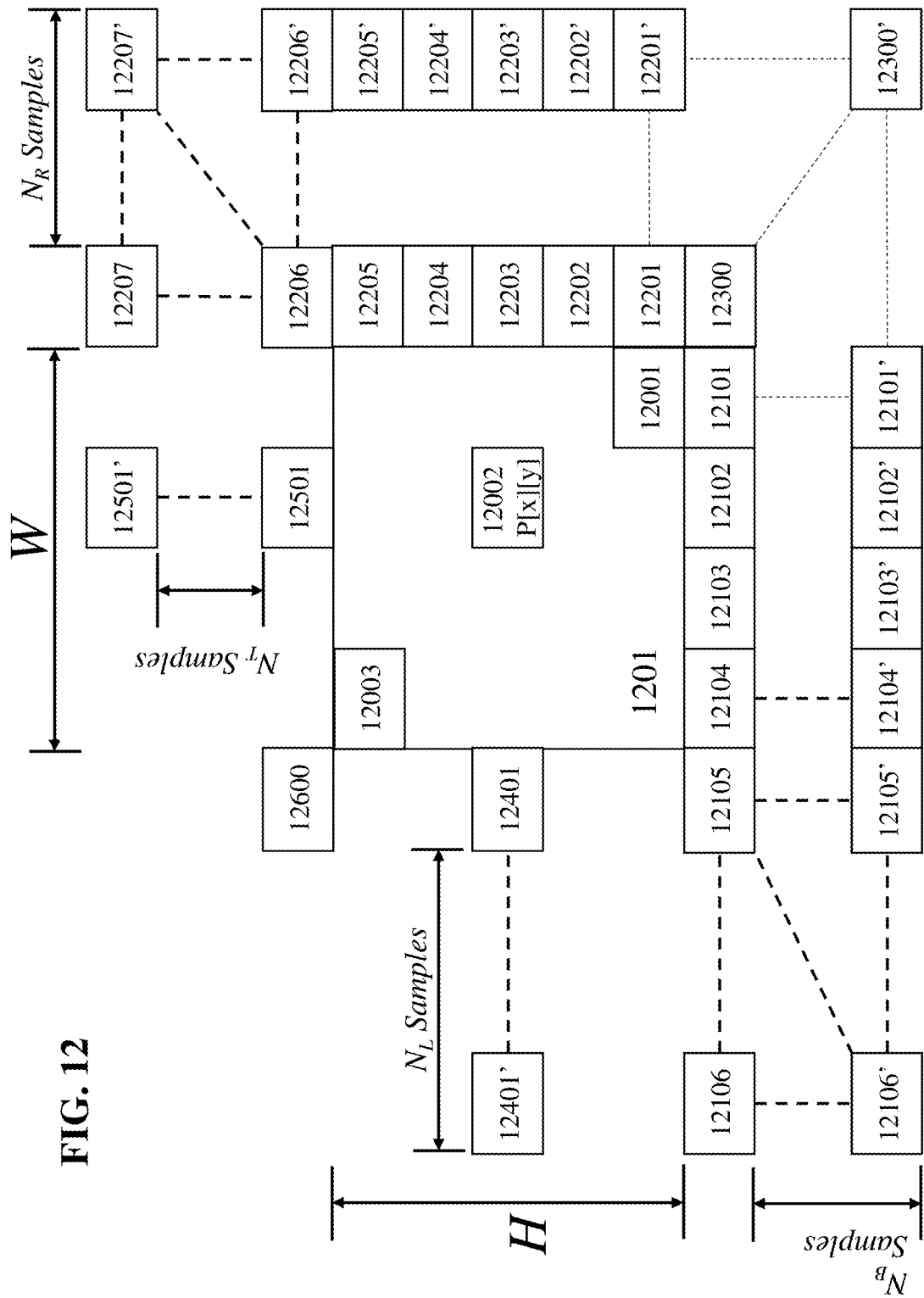
FIG. 12 shows yet another exemplary embodiment for deriving intra prediction samples when the intra prediction mode for a coding block is the planar mode.

FIG. 12 is a diagram illustrating neighboring samples used in the derivation of intra prediction samples of planar mode in yet another implementation.

In some embodiments, and when an encoder adopts a special coding order and a decoder uses a corresponding decoding order, bottom and right neighboring samples will be reconstructed before coding or decoding the block. In this case, bottom and right neighboring samples of the block are employed to derive intra prediction samples of the block.

The intra predictor employs a method described in the present document to determine intra prediction samples of the block 1201 if an intra prediction mode of the block 1201 is planar mode.

In FIG. 12, block 1201 is a block with its bottom-right sample being sample 12001 (e.g. p[0][0]) and its top-left sample being sample 12003 (e.g. p[W−1][H−1]). W and H are width and height of the block, respectively, measured in number of samples (or pixels). Sample 12002, also marked as p[x][y] for x being equal to 0, 1, . . . , W−1 and y being equal to 0, 1, . . . H−1, is a sample in the block to be predicted.

In FIG. 12, samples 12101 (e.g. p[0][−1])~12105 (e.g. p[W][−1]) are bottom neighboring samples of the block. From sample 12105 (e.g. p[W][−1]) to left direction, there are another $N_L$ bottom neighboring samples in the same row as sample 12105, that is, samples p[W+1][−1], . . . , p[W+$N_L$][−1] (e.g. sample 12106 is p[W+$N_L$][−1]). Besides samples 12101 (e.g. p[0][−1])~12106 (e.g. p[W+$N_L$][−1]), $N_B$ additional lines of bottom neighboring samples are employed in deriving the intra prediction samples of block 1201. Samples 12101' ~12106' are samples p[0][−1−$N_B$], p[1][−1−$N_B$], . . . , p[W+$N_L$][−1−$N_B$].

In FIG. 12, samples 12201 (e.g. p[4][0])~12206 (e.g. p[4][H]) are right neighboring samples of the block. From sample 12206 (e.g. p[−1][H]) to top direction, there are another $N_T$ right neighboring samples in the same column as sample 10206, that is, samples p[−1][H+1], . . . , p[−1][H+$N_T$] (e.g. sample 12207 is p[−1][H+$N_T$]). Besides samples 12201 (e.g. p[−1][0])~12207 (e.g. p[−1][H+$N_T$]), $N_R$ additional columns of right neighboring samples are employed in deriving the intra prediction samples of block 1201. Samples 12201' ~12207' are samples p[−1−$N_R$][0], p[−1−$N_R$][1], . . . , p[−1−$N_R$][H+$N_T$].

In FIG. 12, sample 12300 (e.g. p[−1][−1]) is a bottom-right neighboring sample of the block. After more bottom and right neighboring samples are involved in in deriving the intra prediction samples of block 1201, bottom-right neighboring samples may include samples from 12300 to 12300', that is, samples p[−1][−1], p[−1][−2], p[−2][−1], p[−2][−2], . . . , p[−1−$N_R$][−1−$N_B$].

In FIG. 12, sample 12401 (e.g. P[W][y]) is a left neighboring sample of the block. Samples p[W+1][y], . . . , p[W+$N_L$][y] (e.g. sample 12401' is p[W+$N_L$][y]) are another $N_L$ left neighboring samples in the same row as sample 12401. Sample 12501 (e.g. P[x][H]) is a top neighboring sample of the block. Samples p[x][H+1], . . . , p[x][H+$N_T$] (e.g. sample 12501' is p[x][H+$N_T$]) are another $N_T$ top neighboring samples in the same column as sample 12501. Sample 12600 (e.g. p[W][H]) is a top-left neighboring sample of the block.

In some embodiments, the bottom and right neighboring samples of the block can be collectively referred to as first reference samples. In other embodiments, the bottom-right samples 12300~12300' may also be included in first reference samples. In other words, the first reference samples contains the available neighboring samples of the block. The top and left neighboring samples of the block can be collectively referred to as second reference samples. In some embodiments, the top-right sample 12600 may also be included in second reference samples. In other words, the second reference samples contains the reference samples to be derived using the available reference samples. The second reference samples are located on the corresponding opposite sides of the first reference samples of the block.

The intra predictor calculates prediction sample of sample 12002 using right neighboring samples and left neighboring samples in the same row as sample 12002, and bottom neighboring samples and top neighboring samples in the same column as sample 12002.

The intra predictor calculates the second reference samples based on the first samples. In some embodiments, and to reduce the computational complexity of the intra predictor, $N_R$ and $N_B$ are equal (for example a positive integer M), $N_T$ and $N_L$ are equal (for example a non-negative integer N). In some embodiments, when M is equal to 1 and N is equal to 0, the method described in this embodiment is similar to that described in the context of FIG. 11.

In some embodiments, equations (5)~(7) are used to calculate intra prediction samples of the block in planar mode. The intra predictor calculates the left neighboring samples using equation (5) (or an equivalent implementation of equation (5) using adding and bit-wise arithmetic shifting operations), wherein i=0, 1, . . . , N. In equation (5), the weights of samples in the first reference samples are based on their distances to the left neighboring samples in calculating $p_j$.

The intra predictor calculates the top neighboring samples using equation (6) (or an equivalent implementation of equation (6) using adding and bit-wise arithmetic shifting operations), wherein i=0, 1, . . . , N. In equation (6), the weights of samples in the first reference samples are based on their distances to the top neighboring samples in calculating $p_j$.

In some embodiments, the intra predictor calculates the sample to be predicted (e.g. p[x][y]) as a weighted sum of the samples in the first reference samples and the second reference samples. In other embodiments, when equal weights applied, p[x][y] can be a numerical average of samples in the first reference samples and the second reference samples in the same row or column, that is, samples 12401~12401', 12203~12203', 12103~12103' and 12501~12501' as exampled in FIG. 12. In yet other embodiments, unequal weights are based on their distances to p[x][y]. An example is shown by equation (7) (or an equivalent implementation of equation (7) using adding and bit-wise arithmetic shifting operations).

Figure 13:
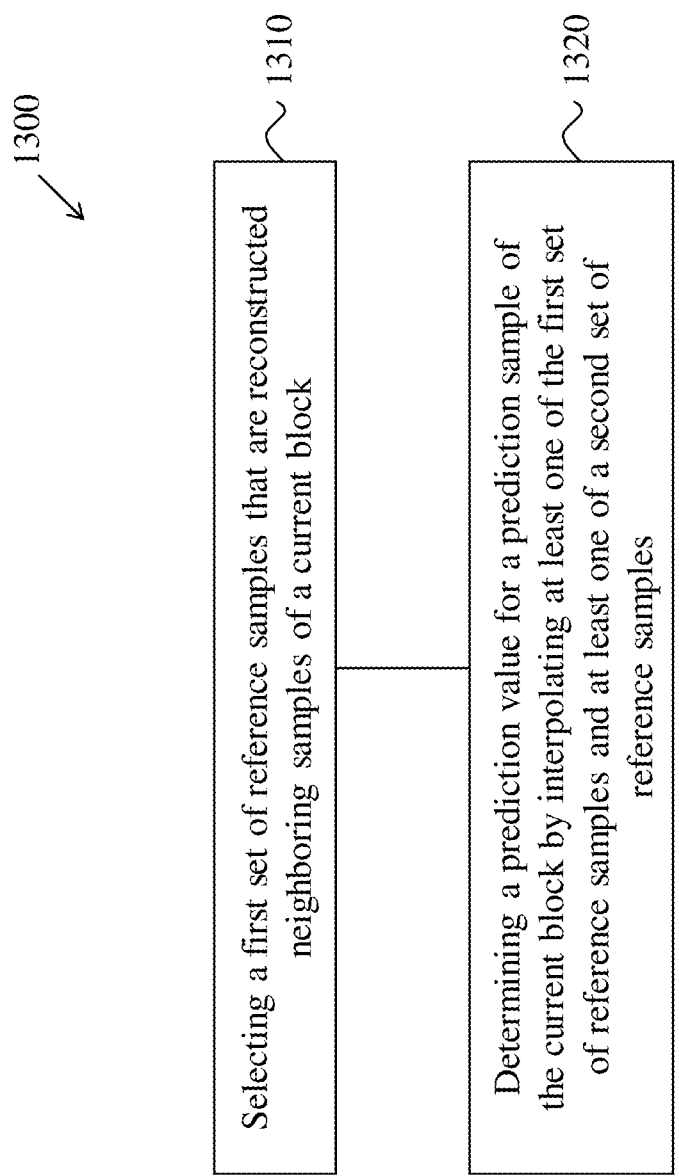
FIG. 13 shows a flowchart of an example method for visual media coding in accordance with the presently disclosed technology.

FIG. 13 shows a flowchart of an example method 1300 for visual media coding in accordance with the presently disclosed technology. The method 1300 includes, at step 1310, selecting a first set of reference samples that are reconstructed neighboring samples of a current block. In some embodiments, the reconstructed neighboring samples, which are used for intra prediction, are not in-loop filtered. In an example, this is consistent with implementation of the H.265/HEVC standard.

The method 1300 includes, at step 1320, determining a prediction value for a prediction sample of the current block by interpolating at least one of the first set of reference samples and at least one of a second set of reference samples. In some embodiments, and in the context of at least FIG. 5A, a reference sample of the second set of reference samples is based on a weighted sum of a first sample and a second sample from the first set of reference samples. The reference sample is aligned horizontally with the first sample, aligned vertically with the second sample, and positioned on an opposite side of the prediction sample with respect to either the first or the second sample.

In some embodiments, and implementable in a video encoder, the method 1300 further includes repeating steps 1310 and 1320 for each sample in the current block, calculating a residual of the current block using the prediction values corresponding to the each sample of the current block, and encoding the residual into a bitstream.

In some embodiments, and implementable in a video decoder, the method 1300 further includes parsing a bitstream representation of the current block to determine a residual of the current block, and reconstructing a sample of the current block based on a sum of the prediction sample and the residual.

In some embodiments, the weighted sum comprises a first weight that multiplies the first sample and a second weight that multiplies the second sample. In one example, the first and second weights are based on a distance between the reference sample and the first sample and a distance between the reference sample and the second sample. In another example, the first weight is equal to the second weight.

In some embodiments, the interpolation is based on an average of the at least one of the first set of reference samples and the at least one of the second set of reference samples. In other embodiments, the interpolation is based on a weighted sum of the at least one of the first set of reference samples and the at least one of the second set of reference samples.

In the context of at least FIGS. 5A and 5B, the present document discloses another method of determining a prediction value at a pixel location in a coding block of video, which comprises H pixel rows and W pixel columns, and where the method includes the steps of:
  (a) deriving a right reference sample by interpolating using a first top reference sample whose location is outside the coding block and a first left reference sample whose location is outside the coding block, with (i) the first top reference sample being in a same pixel column as the right reference sample, and (ii) the first left reference sample, the pixel location and the right reference sample being in a same pixel row,
  (b) deriving a bottom reference sample by interpolating using a second top reference sample whose location is outside the coding block and a second left reference sample whose location is outside the coding block, with (i) the bottom reference sample being in a same pixel column as the second top reference sample and the pixel location, and (ii) the bottom reference sample being in a same row as the second left reference sample,
  (c) determining the prediction value to be a weighted sum of the first left reference sample, the second top reference sample, the right reference sample and the bottom reference sample, and
  (d) using the prediction value for further processing of the video block.

In some embodiments, this method may further include repeating steps (a)-(d) for each pixel in the coding block, calculating a residual of the coding block using the prediction values corresponding to each sample, and encoding the residual into a bitstream.

In other embodiments, this method may further include parsing a bitstream representation of the coding block to determine a residual of the coding block, and reconstructing a sample of the current block based on a sum of the prediction sample and the residual.

In the context of at least FIGS. 5A and 5B, the present document discloses yet another method of determining a prediction value at a pixel location in a coding block of video, wherein the coding block comprises H pixel rows and W pixel columns, and where the method includes the step of:
  (a) determining the pixel value as a weighted sum of at least two vertical reference samples, and at least two horizontal reference samples, with (i) the at least two vertical reference samples including a first reference sample that is outside the coding block and in a same column as the pixel location, and a second vertical sample that is in a row outside the coding block and a column outside the coding block, and (ii) the at least two horizontal reference samples including a first horizontal reference sample that is outside the coding block and in a same tow as the pixel location, and a second horizontal reference sample that is in a row outsize the coding block and a column outside the coding block.

In some embodiments, and for the method described above, the "vertical" sample may be a sample above the pixel location (a "top" sample) or a sample below the pixel location (a "bottom" sample), and the "horizontal" sample may be a sample to the left or to the right of the pixel location (the "left" and "right" samples, respectively).

In some embodiments, this method may further include repeating step (a) for each pixel in the coding block, calculating a residual of the coding block using the prediction values corresponding to each sample, and encoding the residual into a bitstream.

In other embodiments, this method may further include parsing a bitstream representation of the coding block to determine a residual of the coding block, and reconstructing a sample of the current block based on a sum of the prediction sample and the residual.

In the context of at least FIGS. 5A and 5B, the present document discloses yet another method of determining prediction value at a pixel location within a planar coded coding block of a video frame, and where the method includes the steps of:
  (a) determining the pixel value as a first weighted sum of pixel values at a number of reference pixel locations surrounding the pixel location that are outside the planar coded coding block, with (i) weights used for the first weighted sum being inversely proportional to pixel distance between the pixel location and corresponding reference pixel location,
  (b) for a first reference pixel location at which a reconstructed pixel value is available, using that pixel value for the first weighted sum,
  (c) for a second reference pixel location at which no reconstructed pixel value is available, using a second weighted sum of a vertically collocated previously reconstructed pixel value and a horizontally collocated previously reconstructed pixel value during the determining the pixel value as the first weighted sum, and
  (d) using the pixel value for further processing the planar coded coding block.

In some embodiments, this method may further include repeating steps (a)-(d) for each pixel in the coding block, calculating a residual of the coding block using the prediction values corresponding to each sample, and encoding the residual into a bitstream.

In other embodiments, this method may further include parsing a bitstream representation of the coding block to determine a residual of the coding block, and reconstructing a sample of the current block based on a sum of the prediction sample and the residual.

In some embodiments, the weights used in the first and second weighted sums may depend on the taxicab distances between the pixel location and the locations of the reference samples, which is defined as the sum of the absolute differences of their Cartesian coordinates. For example, the taxicab distance (also called the Manhattan distance) between $(x_0, y_0)$ and $(x_1, y_1)$ is equal to $(|x_0-x_1|+|y_0-y_1|)$.

For example, FIG. 5B shows a coding block 501 that includes a pixel (5002) whose prediction value needs to be determined given the four reference pixels (5103, 5203, 5206 and 5105, shown with bold outlines), and implicitly, the two reconstructed pixels (5401 and 5501). For the distances between the pixels shown in the example in FIG. 5B, the values of the reconstructed pixels (5401 and 5501) may be computed as:

$$5401=(5105*(c+d)+5203*a)/(a+c+d), \text{ and} \qquad (8)$$

$$5501=(5103*c+5206*(a+b))/(a+b+c). \qquad (9)$$

Here, the terms a, b, c, and d represent how far the pixel whose prediction value is being determined is from top edge, bottom edge, left edge and right edge of the current block, respectively. Therefore, a+b=H, and c+d=W. In some embodiments, the prediction value may be computed as a simple average of the values of the reference and reconstructed pixels, e.g.

$$5002=(5103+5203+5401+5501)/4. \qquad (10)$$

In an exemplary implementation, when values of only the four reference pixels are explicitly available, equation (10) is computed using equations (8) and (9).

In other embodiments, the prediction value may be computed as a weight sum of the reference and reconstructed pixels, e.g.

$$5002=5103*b/(a+b+c+d)+5203*d/(a+b+c+d)+\\5501*a/(a+b+c+d)+5401*c/(a+b+c+d). \qquad (11)$$

In general, ways of combining pixels, other than equation (10) and (11) may be used. For example, equation (10) represents simple averaging, while equation (11) represents inverse-distance-weighted averaging. Other possibilities, such as favoring weights of reconstructed reference samples over intermediate reference sample may also be used. Using equations (8) and (9), and the dimensions of the coding block (height, H and width, W), equation (11) may be rewritten as $$5002=5103*H*(b+c)/(H+c)*(H+W)+5203*W*(a+d)/\\(W+a)*(H+W)+5206*a*H/(H+c)*(H+W)+\\5105*c*W/(W+a)*(H+W). \qquad (12)$$

As shown in equation (11), the prediction value of the pixel (5002) depends on the explicitly available (or "non-virtual" or "not reconstructed") reference pixels (5103, 5203, 5206 and 5105) with sample/pixel weights that are based on the taxicab distances between the non-virtual reference samples and the pixel (5002) whose prediction value is being determined.

In an example, for non-virtual reference samples that are diagonal, the weight is proportional to the taxicab distance of a non-virtual reference sample that is non-diagonal, and for reference samples at are in a non-diagonal direction, the weight is proportional to taxicab distance of a corresponding reference sample in the diagonal direction. For example, the weight for pixel 5103 (a non-diagonal reference sample), which is H*(b+c)/(H+c)*(H+W), is proportional to the taxicab distance of a corresponding reference sample that is diagonal (5206), which is (b+c).

For example, for a pair of diagonal and non-diagonal reference samples used to determine the value of a prediction sample, the weight of the diagonal (or non-diagonal) reference sample is proportional to the taxicab distance between the prediction sample and the non-diagonal (or diagonal) sample. In the context of FIG. 5B and equation (12), the weight for a first of a pair of reference samples used to determine the value of a prediction sample is proportional to the taxicab distance between the prediction sample and the second of the pair of reference samples, where the first and second of the pair of reference samples are diagonal and non-diagonal, respectively, or vice versa.

With respect to the above-described methods, it would be appreciated by one of skill in the art that these methods may be extended to include samples as described in FIGS. 6 to 12.

4 Example Implementations of the Presently Disclosed Technology

Figure 14:
FIG. 14 is a block diagram of an exemplary hardware platform for implementing a visual media encoding or decoding technique described in the present document.

FIG. 14 is a block diagram illustrating an exemplary device containing the example video encoder or picture encoder as illustrated in FIG. 2.

Acquisition unit 1401 captures video and picture. Acquisition unit 1401 may be equipped with one or more cameras for shooting a video or a picture of a nature scene. In some embodiments, acquisition unit 1401 may be implemented with a camera to get videos or pictures with depth information. In some embodiments, acquisition unit 1401 may include an infra-red camera component. In some embodiments, acquisition unit 1401 may be configured with a remote sensing camera. Acquisition unit 1401 may also be an apparatus or a device of generating a video or a picture by scanning an object using radiation.

In some embodiments, acquisition unit 1401 may perform pre-processing on videos or pictures, e.g., automatic white balancing, automatic focusing, automatic exposure, backlight compensation, sharpening, denoising, stitching, up-sampling/down sampling, frame-rate conversion, virtual view synthesis, and so on.

Acquisition unit 1401 may also receive a video or picture from another device or processing unit. For example, acquisition unit 1401 can be a component unit in a transcoder. The transcoder feeds one or more decoded (or partially decoded) pictures to acquisition unit 1401. In another example, acquisition unit 1401 obtains a video or picture from another device via a data link to that device.

In some embodiments, acquisition unit 1401 may be used to capture other media information besides videos and pictures, for example, audio signals. Acquisition unit 1401 may also receive artificial information, for example, characters, text, computer-generated videos or pictures, and so on.

Encoder 1402 is an implementation of the example encoder illustrated in FIG. 2. Input of encoder 1402 is the video or picture outputted by acquisition unit 1401. Encoder 1402 encodes the video or picture and outputs a generated video or picture bitstream.

Storage/sending unit 1403 receives the video or picture bitstream from encoder 1402, and performs system layer processing on the bitstream. For example, storage/sending unit 1403 encapsulates the bitstream according to transport standard and media file format, for example, e.g., MPEG-2 TS, ISO base media file format (ISOBMFF), dynamic adaptive streaming over HTTP (DASH), MPEG media transport (MMT), and so on. Storage/sending unit 1403 stores the transport stream or media file obtained after encapsulation in memory or disk, or sends the transport stream or media file via wireline or wireless networks.

In some embodiments, and in addition to receiving the video or picture bitstream from encoder 1402, the input of storage/sending unit 1403 may also include audio, text, images, graphics, and so on. Storage/sending unit 1403 generates a transport or media file by encapsulating such different types of media bitstreams.

The disclosed embodiment may be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Figure 15:
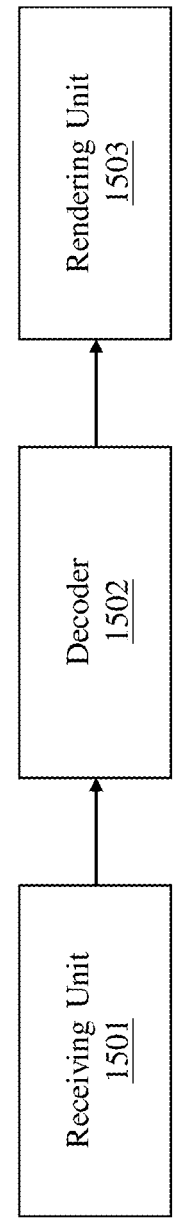
FIG. 15 is a block diagram of another exemplary hardware platform for implementing a visual media encoding or decoding technique described in the present document.

FIG. 15 is a block diagram illustrating another exemplary device containing the example video decoder or picture decoder as illustrated in FIG. 3.

Receiving unit 1501 receives video or picture bitstream by obtaining bitstream from wireline or wireless network, by reading memory or disk in an electronic device, or by fetching data from other device via a data link.

Input of receiving unit 1501 may also include transport stream or media file containing video or picture bitstream. Receiving unit 901 extracts video or picture bitstream from transport stream or media file according to specification of transport or media file format.

Receiving unit 1501 outputs and passes video or picture bitstream to decoder 1502. Note that besides video or picture bitstream, output of receiving unit 1501 may also include audio bitstream, character, text, image, graphic and etc. Receiving unit 1501 passes the output to corresponding processing units in this illustrative embodiment. For example, receiving unit 1501 passes the output audio bitstream to audio decoder in this device.

Decoder 1502 is an implementation of the example decoder illustrated in FIG. 3. Input of encoder 1502 is the video or picture bitstream outputted by receiving unit 1501. Decoder 1502 decodes the video or picture bitstream and outputs decoded video or picture.

Rendering unit 1503 receives the decoded video or picture from decoder 1502. Rendering unit 1503 presents the decoded video or picture to viewer. In an example, rendering unit 1503 may be a screen. Rendering unit 1503 may also be a device separate from this illustrative embodiment, but include a data link to this embodiment. For example, the rendering unit 1503 may be a projector, monitor, TV set, and so on. In some embodiments, rendering unit 1503 performs post-processing on the decoded video or picture before presenting it to viewer, e.g., automatic white balancing, automatic focusing, automatic exposure, backlight compensation, sharpening, denoising, stitching, up-sampling/down sampling, frame-rate conversion, virtual view synthesis, and so on.

In some embodiments, and in addition to receiving a decoded video or picture, the input of rendering unit 1503 can be other media data from one or more units of this illustrative embodiment, e.g., audio, character, texts, images, graphics, and so on. The input of rendering unit 1503 may also include artificial data, for example, lines and marks drawn by a local teacher on slides for attracting attention in remote education application. Rendering unit 1503 composes the different types of media together and then presented the composition to viewer.

This illustrative embodiment may be a device capable of decoding or processing a video (or picture) bitstream in applications of video communication, for example, mobile phone, computer, set-top box, TV set, monitor, media server, portable mobile terminal, digital camera, broadcasting device, CDN (content distribution network) device, surveillance, video conference device, and so on.

Figure 16:
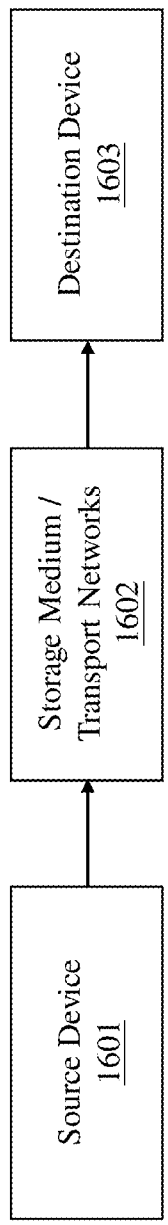
FIG. 16 is a block diagram of yet another exemplary hardware platform for implementing a visual media encoding or decoding technique described in the present document.

FIG. 16 is a block diagram illustrating an exemplary electronic system containing the embodiments shown in FIGS. 14 and 15.

In some embodiments, source device 1601 may be the exemplary embodiment shown in FIG. 14. Storage medium/transport networks 1602 may include internal memory resource of a device or electronic system, external memory resource that is accessible via a data link, data transmission network consisting of wireline and/or wireless networks. Storage medium/transport networks 1602 provides storage resource or data transmission network for storage/sending unit 1403 in source device 1601.

In some embodiments, destination device 1603 may be the exemplary embodiment shown in FIG. 15. Receiving unit 1501 in destination device 1603 receives a video or picture bitstream, a transport stream containing video or picture bitstream or a media file containing video or picture bitstream from storage medium/transport networks 1602.

The electronic system described in this exemplary embodiment may be a device or system capable of generating, storing or transporting, and decoding a video (or picture) bitstream in applications of video communication, for example, mobile phone, computer, IPTV systems, OTT systems, multimedia systems on Internet, digital TV broadcasting system, video surveillance system, potable mobile terminal, digital camera, video conference systems, etc.

Figure 17:
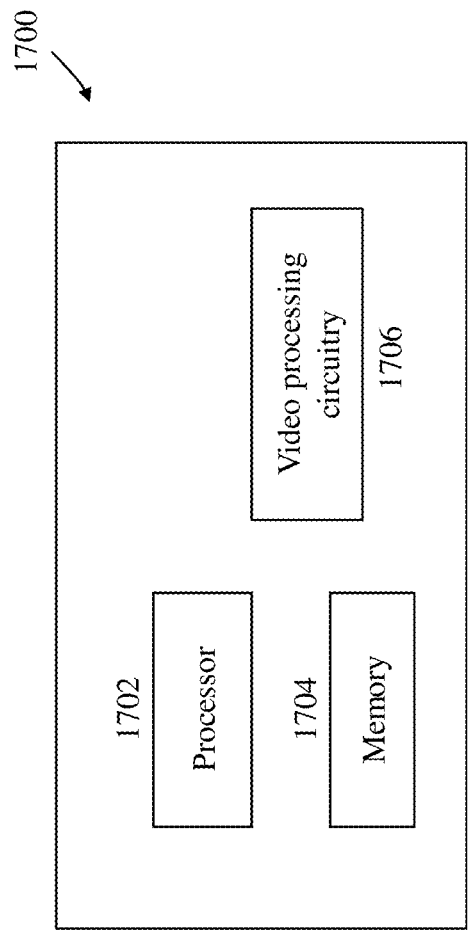
FIG. 17 is a block diagram of yet another exemplary hardware platform for implementing a visual media encoding or decoding technique described in the present document.

FIG. 17 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods (including, but not limited to, method 1300) described in the present document. The memory (memories) 1704 may be used for storing data and code used for implementing the methods and techniques described herein. The video processing hardware 1706 may be used to implement, in hardware circuitry, some techniques described in the present document.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method for video coding, comprising:
selecting a first set of reference samples comprising a top reference sample and a left reference sample that are reconstructed neighboring samples of a current block;
determining a second set of reference samples based on the first set of reference samples, the second set of reference samples comprising a bottom neighboring sample and a right neighboring sample that are neighboring samples of the current block; and
determining a first prediction value for the right neighboring sample, p[W][y], of the current block based on a weighted sum from the first set of reference samples of a first sample in a first predetermined location, p[W][−1], of a same column as the right neighboring sample and a second sample in a variable location, [−1][y], in a same row as the right neighboring sample, and wherein the right neighboring sample is expressed as:

$$p[W][y] = \frac{W}{W+y+1}p[W][-1] + \frac{y+1}{W+y+1}p[-1][y]$$

wherein W is a fixed value and y is a variable value,
wherein the right neighboring sample is aligned horizontally with the first sample, and
wherein the right neighboring sample is aligned vertically with the second sample.

2. The method of claim 1, further comprising:
repeating the determining a first prediction sample for each sample of the current block;
calculating a residual of the current block using the prediction values corresponding to the each sample of the current block; and
encoding the residual into a bitstream.

3. The method of claim 1, further comprising:
parsing a bitstream representation of the current block to determine a residual of the current block; and
reconstructing a sample of the current block based on a sum of the prediction sample and the residual.

4. The method of claim 1, wherein a second prediction value for the bottom neighboring sample, p[x][H], of the current block is based on a weighted sum from a second predetermined location, p[−1][H] and a second variable location, p[x][−1], and wherein the bottom neighboring sample is expressed as:

$$p[x][H] = \frac{H}{H+x+1}p[-1][H] + \frac{x+1}{H+x+1}p[x][-1].$$

5. The method of claim 1, wherein the weighted sum comprises a first weight that multiplies the first sample and a second weight that multiplies the second sample.

6. The method of claim 5, wherein the first and second weights are based on a distance between the right neighboring sample and the first sample and a distance between the right reference sample and the second sample.

7. The method of claim 5, wherein the first weight is equal to the second weight.

8. An apparatus for video processing, comprising:
a processor configured to:
select a first set of reference samples comprising a top reference sample and a left reference sample that are reconstructed neighboring samples of a current block;
determine a second set of reference samples based on the first set of reference samples, the second set of reference samples comprising a bottom neighboring sample and a right neighboring sample that are neighboring samples of the current block; and
determine a first prediction value the right neighboring sample, p[W][y], of the current block based on a weighted sum from the first set of reference samples of a first sample in a first predetermined location, p[W][−1], of a same column as the right neighboring sample and a second sample in a variable location, p[−1][y], in a same row as the right neighboring sample, wherein the right neighboring sample is expressed as:

$$p[W][y] = \frac{W}{W+y+1}p[W][-1] + \frac{y+1}{W+y+1}p[-1][y]$$

wherein W is a fixed value and y is a variable value,
wherein the right neighboring sample is aligned horizontally with the first sample, and
wherein the right neighboring sample is aligned vertically with the second sample.

9. The apparatus of claim 8, wherein the processor is further configured to:
repeat the determine the first prediction sample for each sample of the current block;
calculate a residual of the current block using the prediction values corresponding to the each sample of the current block; and
encode the residual into a bitstream.

10. The apparatus of claim 8, wherein the processor is further configured to:
parse a bitstream representation of the current block to determine a residual of the current block; and
reconstruct a sample of the current block based on a sum of the prediction sample and the residual.

11. The apparatus of claim 8, wherein a second prediction value for the bottom neighboring sample, p[x][H], of the current block is based on a weighted sum from a second predetermined location, p[−1][H] and a second variable location, p[x][−1], and wherein the bottom neighboring sample is expressed as:

$$p[x][H] = \frac{H}{H+x+1}p[-1][H] + \frac{x+1}{H+x+1}p[x][-1].$$

* * * * *